United States Patent [19]

Moncrieff

[11] Patent Number: 5,933,317

[45] Date of Patent: Aug. 3, 1999

[54] CAPACITOR AND METHOD EMPLOYING IMPROVED DIELECTRIC OUTSIDE PLATES

[76] Inventor: J. Peter Moncrieff, 408 Mason Rd., Vista, Calif. 92084

[21] Appl. No.: 08/940,296

[22] Filed: Sep. 30, 1997

Related U.S. Application Data

[63] Continuation of application No. 08/441,524, May 15, 1995.

[51] Int. Cl.[6] ..................................................... H01G 4/06
[52] U.S. Cl. ................... 361/311; 361/301.3; 361/301.4; 361/301.5; 361/305; 361/312; 361/313
[58] Field of Search ............................... 361/301.1, 301.3, 361/301.4, 301.5, 305, 306.3, 311, 312, 313, 522; 29/25.03, 25.41, 25.42; 437/919

[56] References Cited

U.S. PATENT DOCUMENTS

| | | | |
|---|---|---|---|
| 4,469,747 | 9/1984 | Sasaki et al. | 428/325 |
| 4,607,315 | 8/1986 | Wada et al. | 361/321 |
| 4,897,761 | 1/1990 | Lobo et al. | 361/311 |
| 5,331,505 | 7/1994 | Wilheim | 361/306.3 |

*Primary Examiner*—Leo P. Picard
*Assistant Examiner*—Phuong T. Vu

[57] ABSTRACT

A finished capacitor product and method in which the outer dielectric, protecting or encapsulating the basic inner capacitor structure, is improved in dielectric quality, relative to prior art and relative to the inner dielectric between plates. This improved outer dielectric has been experimentally demonstrated to provide improved electrical performance, including better signal handling performance, for the capacitor. This finding is contrary to prior art, which has attached great significance to the quality of the inner dielectric between capacitor plates, but has not attached great significance to the quality of the dielectric outside the capacitor plates.

15 Claims, 5 Drawing Sheets

CAPACITOR AND METHOD EMPLOYING IMPROVED DIELECTRIC OUTSIDE PLATES

This is a continuation of application Ser. No. 08/441,524, filed May 15, 1995.

BACKGROUND OF THE INVENTION

1. Field of Invention

The present invention pertains to capacitors and the dielectrics employed in their construction.

2. Description of Prior Art

A basic inner capacitor structure consists of one pair of plates, separated by a dielectric. Most practical capacitors consist of an array of pairs of facing plate surface areas, the members of each facing pair being separated one from another by a dielectric.

The prior art has attached great significance to this dielectric that is situated between facing pairs of plates. It has been recognized that this dielectric affects the performance of the capacitor, because the displacement current and electrical charge/discharge occurs through this dielectric.

The art recognizes that protective or housing dielectrics, partially or wholly encapsulating the basic inner capacitor structure, are useful to convert a basic inner capacitor structure into a housed capacitor, to make a finished capacitor product having utility in the real world. However, prior art has not attached great significance to any dielectric that is situated outside the space between facing pairs of plates, including protective or encapsulating dielectrics. Prior art has operated under the theory and belief that all of the displacement current and electrical charge/discharge between facing pairs of plates occurs only through the dielectric that is situated between facing pairs of plates, and that therefore any dielectric situated outside this space cannot substantially affect the electrical performance of a capacitor.

Thus, prior art capacitors aiming for excellent performance typically employ a dielectric in the space between facing pairs of plates that is excellent, and excels in a recognized measurable parameter such as low dissipation factor; examples are flexible plastic film dielectric materials such as polypropylene, polystyrene, or tetrafluoroethylene. However, when making a finished capacitor product suitably protected by encapsulation for utility in the real world, prior art has employed an encapsulating dielectric material outside this space that is inferior in the same recognized parameter, for example having a higher dissipation factor. Such prior art finished capacitor products usually employ polyester tape as the outer wrapping and epoxy as the end fill of a wrap and fill roll capacitor configuration, or surround the plate array on all sides with epoxy in an encapsulated configuration. Polyester and epoxy are substantially inferior dielectric materials, and measure as having substantially higher dissipation factor, compared to polypropylene, polystyrene, or tetrafluoroethylene. Prior art finished capacitor products have intentionally employed these inferior protective or encapsulating dielectric materials, outside the space between facing pairs of plate surface areas, because these inferior dielectric materials can be cheaper, sturdier, and/or more volumetrically efficient. Prior art has not recognized any problems or electrical performance degradation from their employment of inferior dielectrics outside the space between facing pairs of plates.

A typical prior art film capacitor, for example one rated at 400 VDC, employs a plastic film of 12 micron thickness as a dielectric between facing pairs of plates. The predominant material of this plastic film for a high quality capacitor is typically polypropylene, which has a measured dissipation factor at 1 KHz of 0.0003.

Such a typical prior art film capacitor, as a finished capacitor product, has employed a different dielectric outside the space between facing pairs of plate surface areas. It has employed a protective or encapsulating outer wrap tape made of polyester and adhesive, applied for at least three circumferential revolutions around the capacitor. The thickness of this outer wrap tape has comprised 25 microns polyester, plus the adhesive thickness (which can more than double the thickness for this outer wrap tape). Three layers of this tape have had a thickness of 75 microns of polyester, plus adhesive. Thus, the thickness of the dielectric outside the space between facing pairs of plates has been 75/12, more than 6 times greater, than the thickness of the dielectric between facing pairs of plates—without even counting the added thickness of the adhesive of the outer wrap tape.

The measured dissipation factor for polyester at 1 KHz is 0.0047, which is over 15 times higher (worse) than that of polypropylene. The dissipation factor of common tape adhesives is probably even worse. Measured dissipation factor could be taken as a quality index of dielectric materials, where a quantitatively higher index indicates poorer dielectric quality. Thus, the material of this outer wrap tape has been over 15 times worse in dielectric quality (not even counting the adhesive) than the material between facing pairs of plates.

The thickness of this 15 times worse dielectric material has been more than 6 times greater than the better dielectric material employed between facing pairs of plates. The total degradative effect upon a electromagnetic wave in space (or upon a signal being carried by this wave) by an instance of an inferior dielectric could be taken to be given by the quality index of the dielectric material multiplied by the dimension (e.g. thickness) of that material through which the electromagnetic wave must travel instead of travelling through free space (which is not degradative)—where the quality index is some recognized measurement of dielectric material quality, mathematically configured such that a higher index indicates poorer dielectric quality (e.g. dissipation factor, dielectric constant, etc.). To compare the overall quality of instances two dielectrics, the product of quality index and thickness for one could be compared with a similar product for the other. Thus, the overall quality of the outer wrap dielectric employed by prior art high quality film capacitors has been more than 90 (15 times 6) times worse than the overall quality of the dielectric employed by them between facing pairs of plates.

Some lesser quality capacitors of prior art have employed polyester as the dielectric between facing pairs of plates, and also polyester for the outer wrap tape. Since the dielectric strength of polyester (7000 volts per mil) is over twice that of polypropylene (3000 volts per mil), the thickness of polyester that has been employed between facing pairs of plates has been typically less than the thickness employed of higher quality dielectric materials such as polypropylene. Meanwhile, the thickness of outer wrap tape has remained substantially the same. Thus in such capacitors the thickness of the dielectric outside the space between facing pairs of plates has typically been over twice times 6, i.e. over 12 times the thickness of the dielectric employed between facing pairs of plates. Even though the material is the same (still not counting the adhesive), the capacitor's outer wrap has had about 12 times more degradative effect than the dielectric between facing pairs of plates.

Furthermore, wrap and fill film finished capacitor products of prior art have employed a protective or encapsulating epoxy end fill. The dissipation factor of epoxy is 0.01, over 33 times worse than polypropylene. The typical thickness of this epoxy end fill has been about 3175 microns (⅛ inch), which is over 264 times thicker than 12 microns of the polypropylene film dielectric between facing pairs of plates. Thus, the overall quality of an instance of this dielectric employed by these high quality prior art capacitors outside the space between facing pairs of plates has been over 8712 times worse than the dielectric employed between facing pairs of plates.

Other film finished capacitor products of prior art have been totally encapsulated in epoxy, either by dipping or by potting within a hard plastic case. The thickness of the epoxy coating for such capacitors has encompassed a range of approximately 1000 to 10,000 microns (1 mm to 10 mm). Thus such prior art capacitors have employed a dielectric outside the space between facing pairs of plates whose overall quality is 2750 to 27,500 times worse than the dielectric between facing pairs of plates, where this latter dielectric is made from a high quality material such as polypropylene. The adverse impact of this inferior dielectric is compounded by the fact that it totally encases these prior art capacitors.

Other prior art capacitors (e.g. Wada, Wilheim) have employed other materials as the inner dielectric between facing pairs of plates, including rigid materials such as ceramic, glass, and printed circuit board. The art has recognized that it is necessary to encapsulate and protect the basic inner capacitor structure employing these various inner dielectrics, in order to make a finished capacitor product having utility in the real world. This is especially true for rigid dielectric materials, which are fragile in the thin gauges required between plates to obtain reasonably large capacitance. For this encapsulation, required to make a finished capacitor product, prior art has used a much greater (by at least 20 times) thickness of the same material as the inner dielectric, or has used a much thicker layer of a different material, usually with inferior dielectric quality. Some prior art patents have failed to specify the explicit materials and dimensions of the encapsulation required to make their basic inner capacitor structure into a finished capacitor product having utility in the real world, thereby assuming that conventional manners of encapsulation recognized by the art are acceptable to them. It can be appreciated that these prior art patents, by failing to explicitly address the issue of encapsulation, or by failing to explicitly specify the materials and dimensions of the encapsulation, necessarily fail to anticipate the present invention, and that the present invention is necessarily unobvious in the light of such prior art patents.

In sum, prior art finished capacitor products have employed a dielectric, outside the space between facing pairs of plates, whose overall quality ranges from 12 to 27,500 times worse than the dielectric they employ between facing pairs of plates. To be conservative, one could say that in prior art finished capacitor products the overall quality of the dielectric outside the space between facing pairs of plates has been more than 6 times worse than the overall quality of the dielectric between facing pairs of plates.

Prior art has not recognized that there is a problem with the dielectric outside the space between facing pairs of plates being significantly inferior to the dielectric between facing pairs of plates. As noted, prior art has operated under the theory and belief that all of the displacement current and electrical charge/discharge between facing pairs of plates occurs only through the dielectric that is situated between facing pairs of plates, and that therefore any dielectric situated outside this space cannot substantially affect the electrical performance of a capacitor.

However, it has now been experimentally determined and demonstrated that a dielectric, situated outside the space between facing pairs of plate surface areas, does substantially affect the electrical performance of a capacitor, and that the electrical performance of a capacitor can be improved when the overall quality of the dielectric outside the main plates, relative to the overall quality of the dielectric between the main plates, is improved over prior art.

OBJECTS AND ADVANTAGES

Accordingly, it is an object of the present invention to provide a finished capacitor product in which the overall quality of the dielectric situated outside the space between facing pairs of plates is less than 6 times worse than the overall quality of the dielectric situated between facing pairs of plates. It is a further object of the present invention to provide a finished capacitor product in which the improved dielectric is improved by virtue of its material and/or by virtue of its structure. It is a further object of the present invention to provide improved performance from a capacitor by such a dielectric material and/or structure, and by the method of incorporating such a dielectric material and/or structure.

It has been experimentally determined and demonstrated that improving the quality of the dielectric outside the space between facing pairs of plates does improve the performance of a capacitor. Prior art capacitors employ dielectrics outside this space whose overall quality is more than 6 times worse than the dielectrics inside this space, these dielectrics being worse by virtue of employing inferior dielectric materials, or inferior dielectric structure, or both. It has been demonstrated that capacitor performance improves when the overall quality of the dielectric(s) employed outside this space is less than 6 times worse than the overall quality of the dielectric(s) inside this space. It has been further demonstrated that capacitor performance can be made to progressively improve yet further when the overall quality of the dielectric(s) employed outside this space is progressively improved to be better, even to the points where its overall quality is as good as, and even better than, the overall quality of the dielectric(s) employed between facing pairs of plates.

There might be several reasons for the demonstrated importance of the quality of dielectrics employed outside the space between facing pairs of plates. For example, it is hypothesized that a signal, propagating as an electromagnetic wave from the capacitor terminal to all parts of a capacitor plate, and thus propagating along the dimensions of the plate, could be affected by dielectrics on both sides of this plate. One side of this plate faces the other, opposite polarity plate of the plate pair, and on this side is situated the dielectric between facing pairs of plates, the dielectric through which the displacement current travels between plates. But on the other side of this plate is the dielectric that is outside the space between facing pairs of plates. The displacement current between plates might not travel through this dielectric, but the electromagnetic wave driving electrical charge movement along the plate dimensions would partially travel through this outside dielectric, and thus could be affected by its quality.

DESCRIPTION OF PREFERRED EMBODIMENTS

1. Basic Capacitors

Figure 1A:
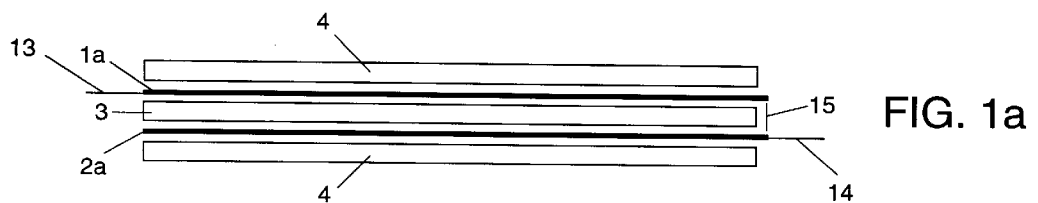
FIGS. 1a–1g show a basic flat two plate capacitor in elevation view of the plate edges, and illustrate some possible embodiments of the present invention.

FIG. 1a shows a basic flat plate inner capacitor structure, to which a protective or encapsulating dielectric is added, in elevation view of the plate edges. A first plate 1a is paired with a second plate 2a, and the pair of plates is separated from each other by a dielectric 3. As shown in FIG. 1a, there is one instance of dielectric 3, and it has an average thickness, which also substantially represents the distance between plate 1a and plate 2a. Plate 1a is electrically connected to the external world via a terminal 13, which is connected to only one side of plate 1a, on one edge; likewise, plate 2a is electrically connected to the external world via a terminal 14, which is connected to only one side of plate 2a, on one edge.

In common engineering parlance, plate 1a is said to be of opposite electrical polarity to plate 2a. This commonly means that, when a capacitor is put to use, opposite polarity plates (or sets of plates) are connected to different circuit points or in a different manner. In order for the two different plates 1a, 2a to function as a capacitor, they must be electrically connected not to the same point, but rather to two different circuit points, such that, under appropriate conditions, one plate can have an excess of one polarity of electrical charge (e.g. +), while the other plate simultaneously can have an excess of the opposite polarity electrical charge (e.g. –).

In FIG. 1a, the surface area of planar plate 1a substantially matches the oppositely facing surface area of paired planar plate 2a, in shape, dimensions, and facing parallel position. The polygon of plate 1a is in substantial registration along all edges with the polygon of plate 2a. A boundary line 15 may be drawn at any of the plate edges, going from the edge of one plate to the corresponding edge of the paired facing plate, and in this case line 15 is orthogonal to the plane of either plate. There is no substantial plate surface area that is extraneous by virtue of extending beyond any boundary line 15 of these mutually registered polygon edges. Thus, all of the plate surface area on plates 1a, 2a is non-extraneous, the plates themselves may be considered non-extraneous, and the set of all non-extraneous plates in one capacitor could be regarded as the non-extraneous plate array.

Substantially every portion of the surface area of plate 1a may be paired off with an equivalent portion of surface area of oppositely facing paired plate 2a, where these two plates can substantially contribute to the capacitance of the capacitor. After all such portions of surface area, from oppositely facing paired plates, are paired off, there is no substantial plate surface area that is extraneous by virtue of being left over as a remainder after this pairing off.

The intraplate internal volume of the capacitor plate array could be said to comprise the volume of space contained between matching paired plates 1a and 2a, including the plates themselves and any dielectric that intervenes between this pair of plates. The intraplate internal volume could be said to be enclosed by each pair of plates contributing to capacitance, or delineated by the set of all possible boundary lines 15 connecting the corresponding edges of these paired plates (further qualifications for these plates will be described below).

The volume of space occupied by the (non-extraneous) plate array as a whole could be said to comprise the volume of space contained or delineated by the outermost (non-extraneous) platelike conductive surfaces of a capacitor, and their edges if applicable. A platelike conductive surface could be said to be a conductive surface of a thin, large surface conductor, e.g. a conductor whose two dimensions delineating this surface are substantially larger than its third dimension. Such a surface could be flat, or could be shaped into any three dimensional form, such as a cylinder or spiral (for a roll capacitor).

For FIGS. 1a–1g, the intraplate internal volume and the volume of the plate array as a whole are substantially the same as each other. But for other capacitor structures, such as multiple stacked plate capacitors, the two volumes are distinct, as will be described below.

A dielectric 4 exists outside the intraplate internal volume of the capacitor plate array, and also outside the capacitor plate array as a whole. Dielectric 4 can be useful for insulating the capacitor from the external world, thereby protecting or encapsulating it, so as to convert the basic inner capacitor structure (comprising plate 1a, plate 2a, inner dielectric 3) into a finished capacitor product.

Dielectric 4 could be the same material as dielectric 3, or it could be different. Each instance of dielectric 4 could be the same as other instances of dielectric 4 in the same capacitor, or different. A given instance of dielectric 4 could have dielectric properties superior to dielectric 3, or inferior, or equal.

The most common practice among prior art finished capacitor products has been for dielectric 4 to be far inferior to dielectric 3, for example by being made of a material with inferior dielectric properties. For example, dielectric 3 could employ a superior dielectric material such as polypropylene, polystyrene, or tetrafluoroethylene, while dielectric 4 is either a polyester outer wrap tape or an epoxy casting. Prior art has had several reasons for this practice. It has been generally believed that only the dielectric between paired plates can affect capacitor performance, since the displacement current and electrostatic forces transpire between these two paired, oppositely facing plates. It has been believed that inferior dielectrics outside the intraplate internal volume would not adversely affect capacitor performance. Inferior dielectrics can be cheaper, sturdier, and volumetrically more efficient.

However, it has now been experimentally determined and demonstrated that the dielectric outside the intraplate internal volume does affect capacitor performance.

There might be several reasons for the demonstrated importance of the quality of dielectrics employed outside the intraplate internal volume. For example, it is hypothesized that a signal being processed by the capacitor, propagating as an electromagnetic wave from capacitor terminal 13 to all parts of a capacitor plate 1a, and thus propagating along the dimensions of the plate, is affected by dielectrics on both sides of this plate. One side of this plate faces plate 2a, and on this side is situated intraplate dielectric 3, the dielectric through which the displacement current travels between plates. But on the other side of this plate is dielectric 4, which is outside the intraplate internal volume. The displacement current between plates might not travel through dielectric 4, but the electromagnetic wave driving electrical charge movement along the plate dimensions would partially travel through dielectric 4, and thus would be affected by its quality.

Figure 1B:
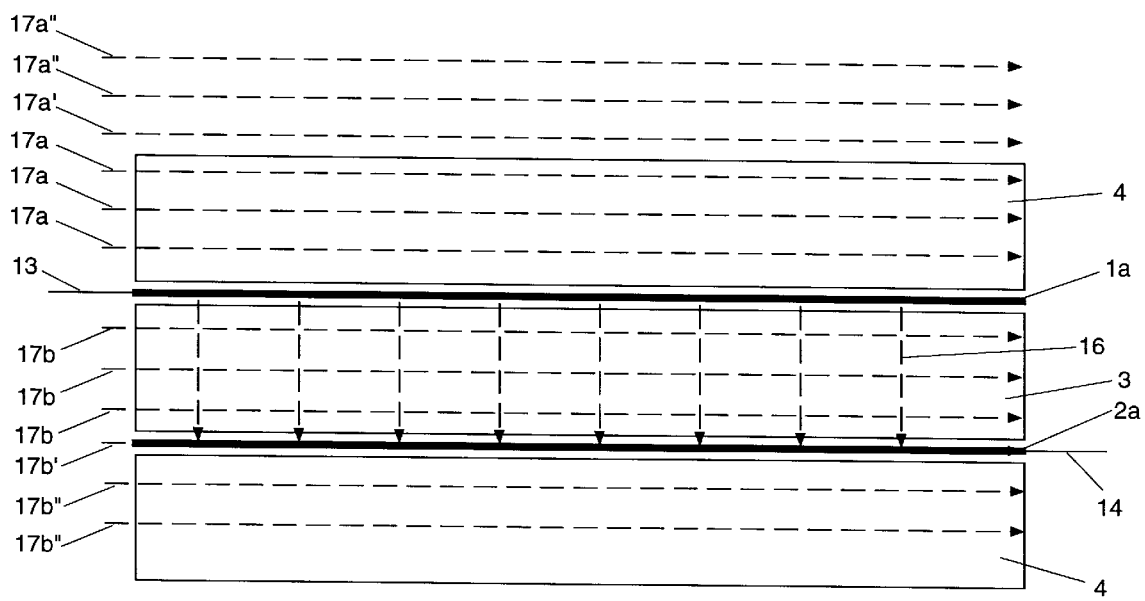

FIG. 1b is similar to FIG. 1a, but is shown enlarged for clarity. FIG. 1b shows a plurality of paths 16 (vertical dashed lines) taken by the displacement current and electrostatic forces transpiring between plates 1a and 2a. Paths 16 travel through dielectric 3, but not dielectric 4, and thus the quality of dielectric 3 should predominate over the quality of dielectric 4 in affecting electrical phenomena occurring along paths 16.

FIG. 1b also shows a plurality of paths 17a and 17b (horizontal dashed lines) taken by the electromagnetic wave representing the signal being processed by the capacitor, as it propagates from terminal 13 to all parts of plate 1a. Similar paths (not shown) would apply from all parts of plate 2a to terminal 14 (the nominal direction is immaterial for present purposes). Paths 17a are located outside the intraplate internal volume of the plate pair 1a, 2a (and of the capacitor), and are on one side of plate 1a (the outward facing side), while paths 17b are located on the other side of plate 1a (the side facing plate 2a and the intraplate internal volume), with most of them being concentrated inside the intraplate internal volume.

An electromagnetic wave travelling along any conductor travels primarily in the space around the conductor. Thus, paths 17a, 17b exist primarily in the dielectrics on either side of plate 1a, namely dielectrics 3 and 4 as shown in FIG. 1b. Thus, the quality of dielectric 4 is just as important as the quality of dielectric 3 in affecting electrical phenomena occurring along paths 17a, 17b.

The electromagnetic wave must reach all parts of plate 1a via paths 17a, 17b, before these plates can be fully effective in moving displacement current between plates along paths 16. Thus, paths 17a, 17b are a prerequisite to paths 16. Now, in a typical roll film capacitor, paths 16 might have a length of 5 microns, while paths 17a, 17b might have a length of 5 centimeters. Typically, then, paths 17a, 17b are 10,000 times longer than paths 16. Thus, the electromagnetic wave representing the signal being processed by the capacitor travels a path 10,000 times longer through dielectrics where it is moreless equally affected by the quality of dielectric 4 as by dielectric 3, than the path it travels where it is predominantly affected by the quality of dielectric 3 over dielectric 4. One might reasonably conclude that the quality of dielectric 4 is just as important to the performance of a capacitor as the quality of dielectric 3, in contrast to the teachings and practice of prior art.

Indeed, the quality of dielectric 4 might even be more important than the quality of dielectric 3. There might be several reasons for this. For example, note that, among paths 17a feeding plate 1a, some paths outside the intraplate internal volume, exemplified in FIG. 1b by a path 17a', travel primarily through air, beyond dielectric 4.

The portion of electromagnetic wave that travels through air travels faster, and is less degraded (by factors such as dielectric absorption), than the portion which travels through a solid dielectric. The electromagnetic wave portion that travels through air along path 17a' can still move electrons and electric charge within plate 1a, throughout plate 1a, even to the end of plate 1a farthest from terminal 13. This portion of the electromagnetic wave most accurately represents the signal being processed by the capacitor, having the fastest risetime and the least degradation of signal quality. The performance of the capacitor could be optimized by allowing this portion of the electromagnetic wave, along path 17a', to remain as fast, pure, and unsullied as possible. This portion of the electromagnetic wave is the first, best hope for realizing, in some aspects, the best possible performance of the capacitor.

Now, any electromagnetic wave travelling a path such as 17a' tends to slightly penetrate volumes of space near that path, and thus penetrate any materials in those volumes of space. Thus, the portion of electromagnetic wave travelling path 17a' would slightly penetrate dielectric 4, and would be affected adversely by it (if its dielectric quality is inferior to that of air). The better the quality of dielectric 4, the less adversely the first, best hope portion of electromagnetic wave will be affected by its slight penetration of dielectric 4. Therefore, the quality of dielectric 4 is critical to realizing the very fastest risetime and most accurate signal handling of which the capacitor is capable, which comes from the portion of electromagnetic wave following path 17a'.

On the other hand, the electromagnetic wave paths 17b feeding plate 1a on the inside of plate 1a, the side facing dielectric 3 and plate 2a, do not offer a similar first, best hope for realizing the best possible capacitor performance. Some of these inside paths 17b travel through dielectric 3, just as equivalent paths 17a (moreless equidistant from plate 1a) travel through dielectric 4. However, consider a path 17b' located as far away from plate 1a as path 17a' is, but located on the inside of plate 1a, instead of the outside as path 17a' is. It does not travel through air as path 17a' does, but rather through plate 2a. Furthermore, on the outside of plate 1a, outside the intraplate internal volume, are a series of paths 17a" farther from plate 1a than path 17a'; they too travel through air. But on the inside of plate 1a, the equivalent series of paths 17b", at the same distance from plate 1a, travel through another instance of dielectric 4, not yet through air. Thus, the electromagnetic wave paths 17b on the inside of a plate, most of which are concentrated inside the intraplate internal volume, do not offer the same opportunity for the best possible capacitor performance as do the paths 17a on the outside of a plate, outside the intraplate internal volume.

Similar considerations apply to the electromagnetic wave paths feeding (or being fed by) plate 2a (these paths not shown, for the sake of clarity).

The various electromagnetic wave paths 17b might be further compromised because they interfere with the electromagnetic wave paths (not shown) feeding (or being fed by) plate 2a. On the other hand, the various paths 17a would have much less interference with the electromagnetic wave paths feeding (or being fed by) plate 2a.

In sum, the electromagnetic wave paths 17a outside the intraplate internal volume are the only paths that can offer the best possible capacitor performance. Thus, the dielectric whose quality can most affect these outside paths is the dielectric that is most important to realizing the best possible capacitor performance. This dielectric is the one closest to the electromagnetic wave paths outside the intraplate internal volume. And this dielectric is the dielectric outside the intraplate internal volume, dielectric 4 in FIG. 1*b*, not the dielectric inside the intraplate internal volume, dielectric 3 in FIG. 1*b*. Therefore the dielectric outside the intraplate internal volume, and/or outside the plate array as a whole, can be the one whose quality is the most critical to realizing the best possible performance from a capacitor. This is the dielectric whose quality is addressed by the present invention.

The overall quality of dielectric 4 can be affected not only by the material of which it is made, but also by its structural design. For example, if the solid part of dielectric 4 is made thinner instead of thicker, then more of the electromagnetic wave paths 17*a* in FIG. 1*b* can travel through air instead of a solid dielectric, and capacitor performance could thereby be improved. Different wavelengths of electromagnetic wave penetrate solid dielectrics to different extents, and it might be beneficial to reduce the thickness of the solid part of dielectric 4 to be suitably optimized for the electromagnetic wavelength relevant to the frequency of signal to be processed by the capacitor. Such a solid dielectric 4 with optimally thin thickness could be superior to a thicker dielectric made of the same solid material.

Dielectric 4 could be made of a combination of materials. It could be partially or wholly fluid, and thus only partly solid or not at all solid. The capacitor could be designed to be immersed in a dielectric fluid at its point of application, having appropriate structural means for suspending it in that fluid. Dielectric 4 would then comprise such a fluid. Such a fluid might act as a superior dielectric 4, superior to a solid material that might be employed for dielectric 3. For example, a capacitor could be designed with wire lead terminals sturdy enough to structurally support the capacitor in a fluid such as air, and keep the seemingly naked plates away from other nearby dielectrics or conductors. Dielectric 4 would then comprise the air outside plates 1*a* and 2*a*, the air outside the intraplate internal volume of the capacitor and also outside the plate array as a whole.

The dielectric quality of the materials constituting dielectric 4 and dielectric 3 could be specified by a quality index, correlated with any recognized manner of evaluating or measuring a dielectric's quality, and mathematically configured such that a higher index indicates poorer dielectric quality. For example, the following are criteria which could be employed for a quality index of a dielectric material: dissipation factor, dielectric constant, dielectric absorption, molecular dipole moment, reciprocal of propagation velocity for an electromagnetic wave, degradative change in a signal. For example, in a signal affected by the dielectric, such as a signal being processed by the capacitor, the degree of aberrant change and/or type of change in the signal might be relevant as a quality index.

Dielectric 4 could be improved in overall quality relative to dielectric 3 by employing a material or combination of materials for making dielectric 4 whose quality index is not significantly worse than (or even equal to or better than) the material employed for dielectric 3. Alternatively or additionally, dielectric 4 could be improved in overall quality relative to dielectric 3 by employing a structure that is not significantly worse than the structure of dielectric 4. Some of the possible variations of these factors are illustrated by the following examples of preferred embodiments of the present invention, as described for FIGS. 1*a*–1*g*.

2. Flat Two Plate Capacitors

In the FIG. 1*a* example, dielectric 4 is shown as having the same structure as dielectric 3, including the same thickness, and dielectric 4 is made from a material having at least one dielectric quality index that is no greater than 6 times worse than the material from which dielectric 3 is made. For example, if dielectric 3 were made from polypropylene, then dielectric 4 could be made from an equal thickness of polysulfone. The dissipation factor of polysulfone is only 3 times higher than that of polypropylene, so if dissipation factor is designated as an appropriate quality index, then the overall quality of dielectric 4 would be merely 3 times worse than the overall quality of dielectric 3, which is less than 6 times worse. As a further example, dielectric 3 could be made from polyester while dielectric 4 could be made from polypropylene. Dielectric 4 could then actually be superior to dielectric 3, by virtue of being made of superior dielectric materials while having the same structure.

Figure 1C:
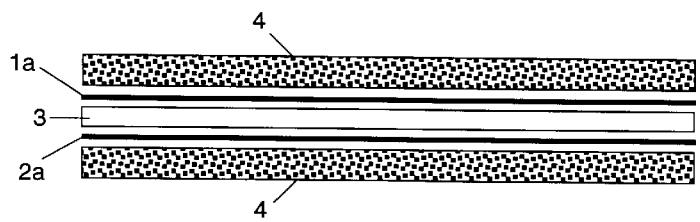

FIG. 1*c* is similar to FIGS. 1*a*–1*b*. In FIG. 1*c*, dielectric 4 is made from a composite of materials. One of these materials could be the same as the material of which dielectric 3 is made, and another material in the composite could be superior. For example, dielectric 3 could be made from polypropylene while dielectric 4 could be made from a composite of polypropylene and trapped bubbles (shown as black dots) of a gas (or vacuous void) that is a superior dielectric to polypropylene (such a composite is sometimes called foamed or cavitated polypropylene). Because the material of dielectric 4 is superior to that of dielectric 3, the structure of dielectric 4 could be somewhat inferior to the structure of dielectric 3. Yet dielectric 4 could still emerge with an overall quality no greater than 6 times worse than dielectric 3, or even equal or superior to dielectric 3. For example, dielectric 4 could be slightly more than 6 times thicker than dielectric 3, yet emerge with an overall quality no greater than 6 times worse than dielectric 3. Or dielectric 4 could be structurally somewhat thicker than dielectric 3, as shown in FIG. 1*c*, yet emerge as being overall equal or superior to dielectric 3. Dielectric 4 could also be a composite of plural materials, some perhaps superior, some perhaps inferior, and/or some perhaps equal to the material of dielectric 3.

Figure 1D:
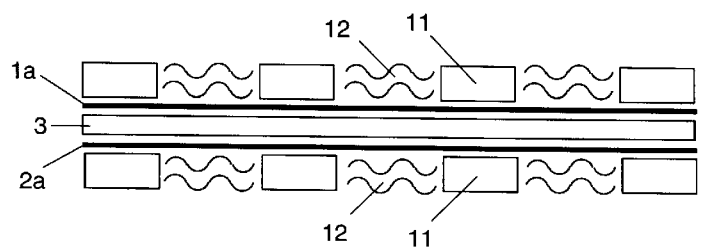

FIG. 1*d* is similar to FIGS. 1*a*–1*c*. In FIG. 1*d*, the solid part of dielectric 4 is disposed as a strip or strips 11 running along the outside surfaces of plates 1*a*, 2*a*, in this case from the foreground to the rear of FIG. 1*d*. This is an example of a nonuniform dielectric proximate to a conductor surface, which is the subject of a separate patent by the inventor. In FIG. 1*d*, strips 11 of the solid part of dielectric 4 are made from the same material as dielectric 3. But dielectric 4 in FIG. 1*d* also comprises a fluid part 12. Fluid part 12 comprises the fluid occupying the spaces between strips 11, and could be air or any fluid in which the capacitor is immersed. Dielectric 4 thus comprises a combination of materials. In the case of FIG. 1*d*, one of these materials in this combination could be equal in dielectric quality to the material of which dielectric 3 is made, while the other material (e.g. air) could be superior. Because the combination of materials of dielectric 4 could be superior to that of dielectric 3, the structure of dielectric 4 could be somewhat inferior to the structure of dielectric 3, yet dielectric 4 could still emerge overall as an equal or superior dielectric. For example, strips 11 of dielectric 4 could be structurally somewhat thicker than dielectric 3, as shown in FIG. 1*d*, yet dielectric 4 would still emerge as being overall equal or superior in dielectric properties to dielectric 3.

FIG. 1d could also be described in an alternative fashion. Strips 11 of dielectric 4 could be made of the same material as dielectric 3. But the structure of dielectric 4 could be regarded as being superior to the structure of dielectric 3. The structure of dielectric 4 could be regarded as superior for several reasons. For example, it could be regarded as superior because it provides for some parts of the surface of conductor plates 1a, 2a to have proximate access to a superior dielectric material, such as fluid part 12.

If the structure of dielectric 4 in FIG. 1d is superior to the structure of dielectric 3 in some respects (allowing access of fluid part 12 to conductor plates 1a, 2a), it could be inferior in some other respects (being thicker in the solid parts, as shown in FIG. 1d), yet still allow dielectric 4 to emerge as being overall equal or superior in dielectric properties to dielectric 3. Alternatively or additionally, if the structure of dielectric 4 in FIG. 1d is superior to the structure of dielectric 3 in some respects (allowing access of fluid part 12 to conductor plates 1a, 2a), the material of the solid parts of dielectric 4 (e.g. strips 11) could be inferior to the material of which dielectric 3 is made, yet still allow dielectric 4 to emerge as being overall equal or superior in dielectric properties to dielectric 3.

Similarly for FIG. 1d, the solid parts of dielectric 4 (e.g. strips 11) could be more than 6 times worse than dielectric 3, in either structure (e.g. thickness) or in material quality index, or some combination thereof, and yet the overall quality of dielectric 4 could still emerge as being no greater than 6 times worse than dielectric 3.

For complex structures, such as FIG. 1d, it could be useful to evaluate the average thickness of a dielectric and/or the average quality index of the material or materials of which it is made. This could be helpful in determining the overall quality of a given dielectric. This average quality index, for any dielectric made up of a composite of plural materials (as in FIG. 1c) or a complex structure of plural materials (as in FIG. 1d), could be obtained by averaging, in manners known to the art, any single one of the criteria given above (e.g. dielectric absorption, dissipation factor, etc.) for determining quality index of each of the various materials employed. For example, in FIG. 1d, dielectric 3 could be simple while dielectric 4 could be complex, comprising solid strips 11 and fluid parts 12. The overall quality of dielectric 4 could be determined by multiplying the average thickness of solid strips 11 over the whole surface of plate 1a (or 2a) by a suitable quality index of the material (or materials) constituting solid strips 11 (assuming for this example that fluid part 12 is a virtually ideal dielectric material such as air). If this product for dielectric 4 is no more than 6 times greater than the similar product for dielectric 3—namely the product of the thickness of dielectric 3 multiplied by the quality index for the material or materials constituting dielectric 3 (using the same category of quality index as was designated for evaluating dielectric 4)—then this is one possible sufficient condition for this structure being in accordance with the present invention.

Figure 1E:
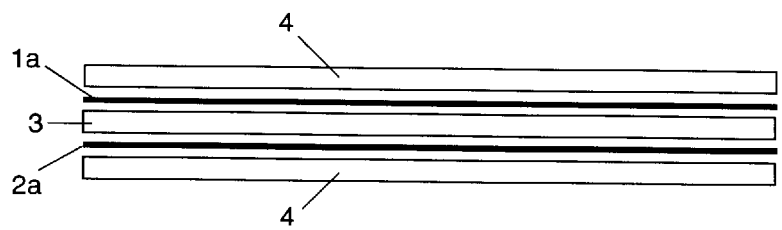

FIG. 1e is similar to FIGS. 1a–1d. In FIG. 1e, solid dielectric 4 could be made from the same material as dielectric 3, and then structurally it could be 6 times thicker than dielectric 3 or less. In FIG. 1e, solid dielectric 4 is shown as being the same thickness as dielectric 3; solid dielectric 4 could also be thinner than dielectric 3, and might thereby provide even better capacitor performance.

In many types of capacitor structures, for instance that shown in FIG. 1e, a thicker solid dielectric 4 can slow, impede, or degrade an electromagnetic wave's propagation along the capacitor plate worse than a thinner solid dielectric 4, all other things being equal. There might be several reasons for this. For example, a thinner solid dielectric 4 might allow more of an electromagnetic wave of a given wavelength or signal of a given frequency to propagate in the air beyond the solid dielectric, without penetrating the solid dielectric, allowing faster propagation and less signal degradation. Thus, a thicker solid dielectric 4 could be intrinsically inferior to a thinner solid dielectric 4, all other things being equal. Furthermore, different wavelengths of electromagnetic wave penetrate solid dielectrics to different extents, and it might be beneficial to reduce the thickness of the solid part of dielectric 4 to be suitably optimized for the electromagnetic wavelength relevant to the frequency of signal to be processed by the capacitor. Such a solid dielectric 4 with optimally thin thickness could be superior to a thicker dielectric made of the same solid material.

Some prior art finished capacitor products have employed the same material for dielectric 4 as for dielectric 3. For example, in a roll film capacitor the same plastic film employed as dielectric 3 between plates has been extended beyond the plates, then being given multiple turns around the roll film capacitor to form the protective or encapsulating outer wrap, which is then heat sealed. But all such prior art capacitors have employed multiple mutually adjacent turns of film for dielectric 4 (with no conductive element intervening among these mutually adjacent turns or layers of dielectric 4). Multiple turns (more than 6) have been considered necessary, because the film is so thin (in order to make the capacitor volumetrically efficient) that multiple layers are required to form an adequately sturdy outer wrap, and also because the heat seal must melt some of the outermost multiple layers together, while not melting the film layers underneath that actually separate conductive plates. Thus, in all such prior art capacitors dielectric 4 has invariably been more than 6 times thicker than dielectric 3, by virtue of this one instance of dielectric 4 comprising multiple mutually adjacent layers of the same material employed for dielectric 3. Likewise, where inner dielectric 3 employs rigid materials, the art has recognized that it is necessary to encapsulate and protect the basic inner capacitor structure employing these rigid inner dielectrics, in order to make a finished capacitor product having utility in the real world. This is especially true for such rigid dielectric materials, which are fragile in the thin gauges required between plates to obtain reasonably large capacitance. Thus, for this encapsulation by outer dielectric 4, required to make a finished capacitor product, prior art has used a much greater (by at least 20 times) thickness of the same material as the inner dielectric, or has used a much thicker layer of a different material, usually having inferior dielectric indices. And therefore in all such prior art capacitors the overall quality of dielectric 4 has been more than 6 times worse than that of dielectric 3, even when both dielectrics employ the same material.

Figure 1F:
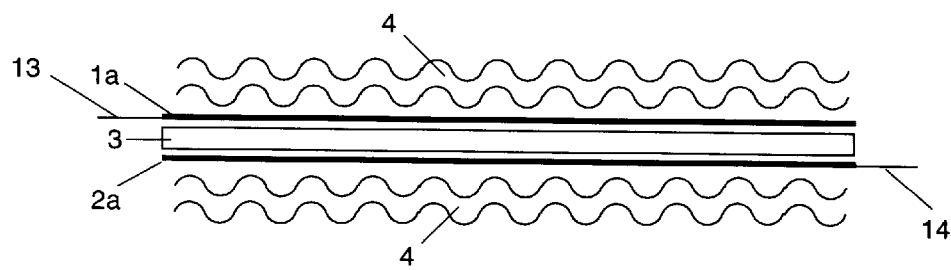

Dielectric 4 could be simply air. In this case, no solid dielectric material would be employed on the outside of plates 1a or 2a, i.e. outside the intraplate internal volume of the capacitor plate array, or outside the capacitor plate array as a whole. FIG. 1f is similar to FIGS. 1a–1e, and shows the same flat plate capacitor, having structural means (for example, wire leads 13, 14) for suspending the capacitor in a fluid; in this case, dielectric 4 could be the fluid into which the capacitor is immersed, such as air. The capacitor could be situated in each application such that a layer of dielectric fluid (e.g. air) would lie on the outside of plates 1a and 2a, immediately adjacent to these plates, and insulating these plates from other nearby objects. Dielectric 4 could be superior to dielectric 3, with respect to material and/or structure, and thus be distinct over prior art. Dielectric 4 could also be equal in quality to dielectric 3, or no greater than 6 times worse than dielectric 3, and still be distinct over prior art, except where both dielectric 3 and dielectric 4 are wholly fluid, and are the same fluid as each other. Prior art has not employed a dielectric for dielectric 4 equal in quality to dielectric 3, or no greater than 6 times worse than dielectric 3, except accidentally, in the case where dielectric 3 and dielectric 4 are wholly fluid and are the same fluid as each other.

FIGS. 1*a*–1*f* illustrate some various possible embodiments of the present invention, as applied to a capacitor with one pair of plates. These various embodiments and their elements could be combined in various combinations, to produce yet further possible embodiments.

Figure 1G:
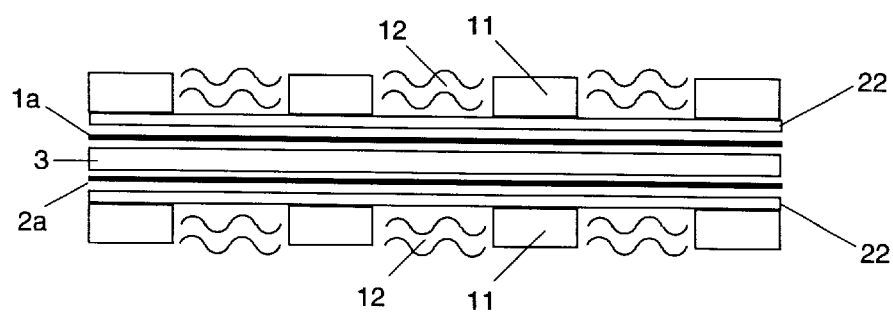

For example, FIG. 1*g* combines aspects of FIGS. 1*d* and 1*e*. In FIG. 1*g*, dielectric 4 comprises a uniform solid dielectric 22, nonuniform solid dielectric strips 11, and fluid part 12 (which could be air). In FIG. 1*g*, dielectric 22 could be in some way superior to dielectric 3; for example, it could be thinner, or made from a higher quality material. This would make room for the addition of nonuniform dielectric strips 11, which could be thicker than dielectric 3, while still keeping the overall quality of the aggregate dielectric 4 equal or superior to dielectric 3. As with FIG. 1*d*, one possible way of determining the overall quality of dielectric 4 in FIG. 1*g* could be to multiply the average thickness over the area of plate 1*a* (or 2*a*) of each constituent part (or fraction) (e.g. 11,12,22) by the quality index for that constituent part (or fraction), and then sum these products—this being a recognized manner of producing a particular type of average known as a weighted average.

Similarly for FIG. 1*g*, the solid parts of dielectric 4 (e.g. strips 11 and uniform solid dielectric 22, as well as fluid parts 12 if significantly less perfect than air) could be more than 6 times worse than dielectric 3, in either structure (e.g. average thickness) or in average material quality index, or some combination thereof, and yet the overall quality of dielectric 4 could still emerge as being no greater than 6 times worse than dielectric 3.

As the art recognizes, it could be appropriate for averages generally to be calculated as a particular subcategory of average known as a weighted average. Thus, for example, the average thickness and/or average material quality index, such as discussed for the complex structures and plural materials of FIGS. 1*d*, 1*g*, could appropriately be calculated as weighted averages (as discussed for FIG. 1*g*). For example, the average material quality index could be weighted by the amount (e.g. by volume) of each of the distinct materials present, and could also be further weighted by the location of each delta amount of each material (for example, the weighted location could relate to the relative proximity of each delta amount of dielectric material to the nearest plate surface or edge). Such weighted average calculations could be performed by addition or integration, in manners known to the art.

Every real finished capacitor product has a dielectric 4. Dielectric 4 could be said to comprise the dielectric material and structure (or combination of dielectric materials and structures) that is outside the volume of the (non-extraneous) plate array as a whole (thus also outside the intraplate internal volume), and is proximate to the outermost (or outermost non-extraneous) platelike conductive surface(s) of that plate array.

Some part of dielectric 4 is necessarily adjacent to the outermost platelike conductive surface(s), but other parts of dielectric 4 might not be adjacent, while still being proximate. For example, in FIG. 1*g*, fluid part 12 and dielectric strips 11 are part of dielectric 4; each is proximate to the one of the outermost conductive surfaces (plate 1*a* or 2*a*), but they are not adjacent to it. Solid dielectric 22 is also part of dielectric 4; it is proximate to plate 1*a* or 2*a*, and is also adjacent to it.

Dielectric elements 11, 12, 22 are considered to all be part of one instance of dielectric 4, rather than distinct instances of dielectric 4, because all three are mutually adjacent, with no conductive element intervening even partly among them.

3. Stacked Plate Capacitors

The various embodiments above and their elements could also be applied to capacitors employing multiple pairs of plates. In some of these capacitors, the nomenclature of the present invention could take on new significance.

Figure 2:
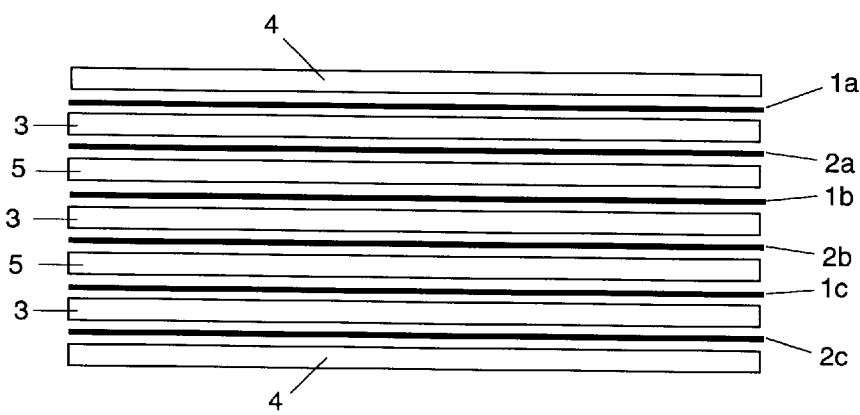
FIG. 2 shows a stacked multiple flat plate capacitor in elevation view of the plate edges.

FIG. 2 shows a stacked plate capacitor, employing multiple pairs of plates, in elevation view of the plate edges. This is essentially a multiple of the structure shown in FIGS. 1*a*–1*g*, identically repeated. Plate 1*a* is paired with plate 2*a*, as above. Likewise, a plate 1*b* is paired with a plate 2*b*, and a plate 1*c* is paired with a plate 2*c*, etc.

All plates 1*x* with a "1" in their reference numeral (e.g. 1*a*, 1*b*, 1*c*, etc.) are electrically connected in common as one polarity, and all plates 2*x* with a "2" in their reference numeral (e.g. 2*a*, 2*b*, 2*c*, etc.) are electrically connected in common as the nominally opposite polarity. The "1" and "2" part of these plate reference numerals may be regarded as being indicative of the plate's polarity, as if they were a "+" and "−".

Each plate pair 1*x*, 2*x* is connected in the same ordered polarity sequence, which in FIG. 2 is 1>2 going from top to bottom; no plate pair follows the 2>1 polarity sequence in this stacked capacitor. In other words, the "1" plate always comes first, and is on top of the "2" plate of each pair as shown in FIG. 2; no plate pair violates this ordered polarity sequence by having the "2" plate first and on top as shown in FIG. 2.

As shown, instances of dielectric 3 separate the oppositely facing plates of each pair from each other: 1*a* from 2*a*, 1*b* from 2*b*, 1*c* from 2*c*, etc. In FIG. 2, all instances of dielectric 3 are shown as having substantially the same thickness as one another, which is the normal case for most capacitors; if they were to have various or varying thickness, then the art recognizes manners for calculating their average thickness. Dielectric 3 is the intraplate dielectric, located inside the intraplate internal volume of the capacitor plate array. In FIG. 2, the intraplate internal volume comprises three distinct slices or layers, separated from one another.

As before, dielectric 4 is located outside the intraplate internal volume, and also outside the (non-extraneous) plate array as a whole.

A new dielectric 5 is now added. Within the capacitor plate array, dielectric 5 separates one pair of non-extraneous plates from another pair; thus, it is located outside the space between each facing pair of plates. Dielectric 5 is located inside the extraplate internal volume of the capacitor plate array; it is outside the intraplate internal volume, but it is inside the volume of the non-extraneous plate array as a whole. Each instance of dielectric 5 could be the same as other instances of dielectric 5 in the same capacitor, or different.

Every real finished capacitor product necessarily has a dielectric 4, for example a dielectric outside the (non-extraneous) plate array as a whole (and outside the intraplate internal volume), separating the (non-extraneous) plates of the plate array from the objects of the external world. Some capacitors also have a dielectric 5, namely a dielectric inside the non-extraneous plate array as a whole but outside the intraplate internal volume.

For dielectric 5, prior art has sometimes intentionally employed a dielectric worse in overall quality than dielectric 3, following their belief that any dielectric outside the space between facing pairs of plates cannot adversely affect the performance of the capacitor. For dielectric 5, prior art has accidentally sometimes employed a dielectric equal in quality to dielectric 3, as a matter of convenience in constructing a multiple layer stacked capacitor. But prior art has not made dielectric 5 superior to dielectric 3. In accordance with the present invention, it could be advantageous to make dielectric 5 superior to dielectric 3. There might be several reasons for this advantage, including some discussed above for FIG. 1b, where the phenomena described for dielectric 4 outside the intraplate internal volume in FIG. 1b could apply similarly to dielectric 5 outside the intraplate internal volume (such as shown in FIG. 2). Dielectric 5 could be made superior to dielectric 3 in a variety of ways, including those described above for FIGS. 1a–1g.

For dielectric 4, prior art has likewise not employed a dielectric superior in quality to dielectric 3. Furthermore, prior art has only employed a dielectric for dielectric 4 whose overall quality is over 6 times worse than the overall quality of dielectric 3, except where both dielectric 3 and dielectric 4 are wholly fluid, and are the same fluid as each other.

4. Roll Capacitors

Figure 3A:
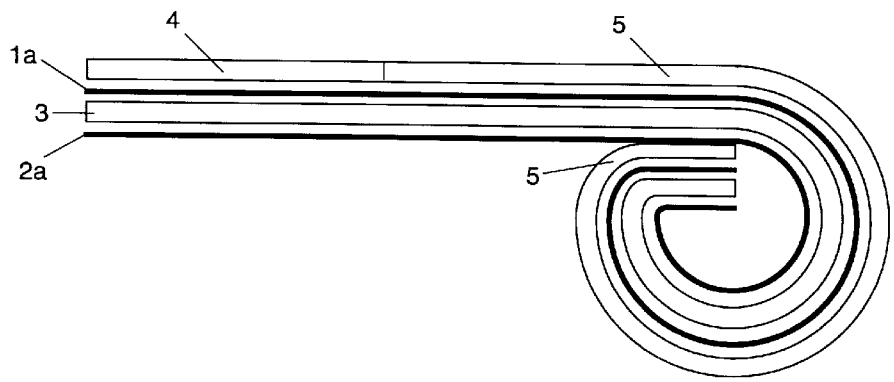
FIG. 3a shows a flat sandwich structure being rolled up to form a roll capacitor, in elevation view of the plate edges.

The capacitor structure described in FIGS. 1a–1g could be thought of as a sandwich structure. Some variation of such a structure or a similar structure could be rolled up into a cylinder, to form a roll capacitor. A roll capacitor may be formed by convolutely winding an appropriate sandwich of plates and dielectrics, in manners known to the art. The shape of a capacitor with rolled up or convolutely wound plates is usually cylindrical initially, but may subsequently be formed into other shapes (e.g. oblong), in manners known to the art (e.g. by selective compression). FIG. 3a shows how one such sandwich structure could be rolled up, to form a roll capacitor, seen in elevation view from the cylinder end. As before, dielectric 3 separates the facing plates 1a, 2a of the one and only plate pair from each other.

What might appear to be a candidate for dielectric 4 in the sandwich structure becomes instead dielectric 5 as the sandwich structure is rolled up to form a roll capacitor, since this dielectric is trapped within the roll capacitor, beneath a non-extraneous plate. In the finished roll capacitor, this dielectric is outside the intraplate internal volume, but inside the non-extraneous plate array as a whole, so it is properly called dielectric 5.

However, if the sandwich structure is rolled up as shown in FIG. 3a, then in the finished roll capacitor the outermost layer would be a dielectric, not a conductive platelike surface (if it were rolled up the reverse way, then conductive plate 2a would be the outermost element). Then some portion of the dielectric layer that is dielectric 5 within the plate array would lie outside the non-extraneous plate array as a whole, since it would be outside the outermost non-extraneous plate. That portion of dielectric that lies outside the non-extraneous plate array is properly called dielectric 4. In accordance with the present invention, this portion of dielectric outside the plate array could advantageously be made such that its overall quality is no more than 6 times worse than dielectric 3, and would thereby be distinct over prior art.

After the sandwich structure is completely rolled up into a cylinder, a further dielectric could be applied to the outside of the roll capacitor, for example an outer wrap. This further dielectric would properly qualify as dielectric 4, or part of dielectric 4, since it lies outside the plate array as a whole.

Thus, dielectric 4 on the outside of a roll capacitor could be an extension of a dielectric from within the plate array as a whole (e.g. an extension of dielectric 5, or perhaps of dielectric 3), or it could be a separately applied dielectric, or some combination of these.

Whatever the source of dielectric 4, the present invention teaches that it could be advantageous to make this dielectric 4 such that its overall quality is no more than 6 times worse than dielectric 3.

Figure 3B:
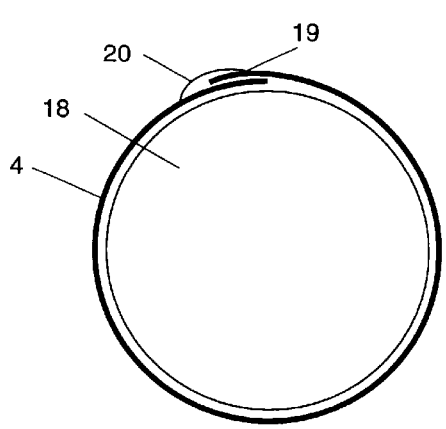
FIGS. 3b–3c show a roll capacitor, in elevation view of the cylinder end.

One such example is shown in FIG. 3b, which shows a finished roll capacitor in elevation view from one end. FIG. 3b shows a completely rolled up roll capacitor 18. The outermost layer of element 18 as shown, roll capacitor 18, is necessarily a non-extraneous plate conductive surface, because any dielectric outside of that non-extraneous plate would be part of dielectric 4, the dielectric outside of the outermost non-extraneous plate. An instance of dielectric 4 is shown as a circumferential cylinder around roll capacitor 18. In the example of FIG. 3b, dielectric 4 could comprise primarily a single layer of polypropylene, of the same thickness and material as dielectric 3 (not shown) within the body of capacitor 18.

The solid layer of dielectric 4 might extend only partway around the circumference of the capacitor 18 cylinder, in which case the remainder of the circumference would probably be occupied by air as the remainder of dielectric 4. Again, this solid layer of dielectric 4 could be an extension of a dielectric from within the plate array as a whole (e.g. an extension of dielectric 5, or perhaps of dielectric 3), or it could be a separately applied dielectric, or some combination of these. If air occupies some or all of the circumference, and thus acts as part or all of dielectric 4, then dielectric 4 could be superior to dielectric 3.

The solid layer of dielectric 4 might extend exactly one complete turn around the circumference of the capacitor 18 cylinder. Then dielectric 4 could be equal in quality to dielectric 3, in this example where the solid layer of dielectric 4 is the same material and thickness as dielectric 3.

The solid layer of dielectric 4 might extend 6 or less turns around the circumference of the capacitor 18 cylinder. Then dielectric 4 could be no more than 6 times worse in overall quality than dielectric 3, in this example where the solid layer of dielectric 4 is the same material and thickness as dielectric 3.

For the sake of structural integrity in applying the solid layer of dielectric 4 (especially if it is a separately applied wrap), it might be advisable to have a slight overlap 19 of layers of dielectric 4, as shown in FIG. 3b. With such a slight overlap, it shall be deemed that there are still substantially N layers of solid dielectric 4, so long as the number of layers, rounded to the nearest whole number, is N, i.e. so long as there are less than N+0.5 layers.

Overlap or flap 19 could constitute a substantial nonuniformity in dielectric 4. Such a substantial nonuniformity could be advantageous to the electrical performance of the proximate conductive plate surfaces of the capacitor, and advantageous to the electrical performance of the capacitor as a whole. The shape, dimensions, and location of overlap or flap 19 could be critical to optimizing this electrical performance. Nonuniform dielectrics proximate to conductors are the subject of a separate patent by the inventor.

Even if there were 6 layers of dielectric 4 in FIG. 3b, this would still be sufficient to clearly distinguish the present invention over prior art, since, in the few cases where prior art has employed mutually adjacent layers of solid dielectric 3 as the only dielectric 4, prior art has employed more than 6 layers. More often, prior art has employed plural layers of a solid dielectric for dielectric 4, where each layer is thicker than an instance of dielectric 3, and also where dielectric 4 is made from a different material (e.g. polyester) with dielectric properties inferior to the material of which dielectric 3 is made (polypropylene in this example).

FIG. 3b also shows a slight amount of an adhesive or sealer 20, which seals the overlapping lip of solid dielectric 4. Prior art has employed an adhesive or sealer that fully occupies the surface of a tape wrap, so that this adhesive or sealer fully envelops the cylindrical surface of the capacitor (usually plural times for the plural circumferential turns of tape wrap); such an adhesive or sealer could adversely affect the overall quality of dielectric 4. FIG. 3b shows that adhesive or sealer 20 could occupy merely a thin line (seen in end view) along the length of the capacitor, thus occupying merely a narrow portion of one circumferential turn. When such a slight and necessary amount of adhesive or sealer 20 is added to a substantially single layer of solid dielectric 4, adhesive or sealer 20 shall be deemed not to adversely affect dielectric 4's qualification to be substantially equal in quality to dielectric 3, if as in this example dielectric 4 is already substantially equal to dielectric 3 in material and structure without the presence of adhesive or sealer 20.

The material and structure of adhesive or sealer 20 as in FIG. 3b could affect the performance of the capacitor, but its effect could be beneficial instead of detrimental, especially if it is applied as a nonuniform dielectric in a suitable manner. Nonuniform dielectrics proximate to conductors are the subject of a separate patent by the inventor.

In the FIG. 3b example, one layer of dielectric 4 is shown as being the same material and thickness as dielectric 3. If one layer of dielectric 4 were superior to dielectric 3 in material and/or structure (e.g. by being thinner), then there might be more than substantially one layer of solid dielectric 4, and dielectric 4 might still be overall equal or superior to dielectric 3. If one layer of dielectric 4 were inferior to dielectric 3 in material and/or structure, then the overall quality of dielectric 4 might still be no greater than 6 times worse than dielectric 3, provided that the total number of layers around capacitor 18 were appropriately less than 6—such that the total average thickness of this instance of dielectric 4, comprising all mutually adjacent layers, multiplied by the quality index of the material of dielectric 4, results in a product no more than 6 times greater than the similar product for one instance (between a facing pair of plates) of dielectric 3.

Figure 3C:
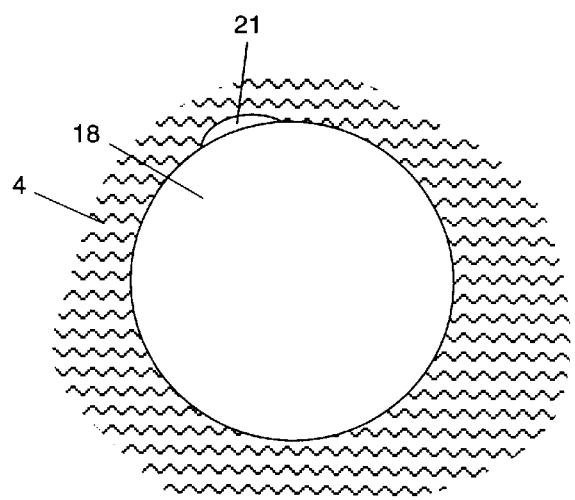

FIG. 3c is similar to FIG. 3b, and shows another possible configuration of the present invention. As before, FIG. 3 shows completely rolled up roll capacitor 18. As before, the outermost layer of roll capacitor 18 is necessarily a platelike conductive surface, because any dielectric outside that conductive surface would be part of dielectric 4, the dielectric outside the outermost non-extraneous plate. In FIG. 3b, dielectric 4 comprises primarily the air around the roll capacitor. The only solid dielectric part of dielectric 4 is a nonuniformly applied dielectric 21, shown here as a strip in end view, this strip extending at least partway along the length of the cylinder that is roll capacitor 18. Nonuniform dielectric 21 could be a solid or liquid dielectric applied to part of the outermost cylindrical surface (which is conductive) of roll capacitor 18. Or nonuniform dielectric 21 could be an adhesive or sealer, like adhesive or sealer 20, perhaps with the purpose of securing the end of the outermost platelike conductive surface against the cylinder, thereby keeping roll capacitor 18 from unravelling. In any case, nonuniform dielectric 21 could often properly be regarded as part of dielectric 4.

The capacitor configuration shown in FIG. 3c can yield excellent performance. Since dielectric 4 is primarily air, the outermost plate is adjacent to air, and this allows the electromagnetic wave to propagate through air across one plate dimension. Some of the benefits of this configuration are similar to those discussed above, for propagation through air on the outside of a plate, in connection with FIG. 1b.

The roll capacitor configuration shown in FIG. 3c could be easily achieved via several means. For example, the roll capacitor could be rolled up in the reverse direction as shown in FIG. 3a (e.g. counter-clockwise instead of clockwise); this would place the last revolution of plate 2a on the outside of the roll capacitor, without any solid dielectric beyond. Alternatively or additionally, when the outermost layer of a capacitor rolling operation winds up as a solid dielectric, then the last revolution of this dielectric could be cut away, thereby leaving the platelike conductive surface beneath as the outermost layer of the roll capacitor. For instance, it was noted that dielectric 5 within the roll capacitor becomes solid dielectric 4 if and when it reaches the outermost revolution of the roll and becomes the outermost layer; if this outermost revolution of solid dielectric that is dielectric 4 is cut away, then dielectric 4 becomes the air around the roll capacitor.

Every real finished capacitor product has at least one instance of dielectric 4 that could be said to comprise the dielectric material and structure (or combination of dielectric materials and structures) that is outside the volume of the plate array as a whole, and is proximate to the outermost platelike conductive surface of that plate array. Some part of dielectric 4 is necessarily adjacent to the outermost platelike conductive surface, but other parts of this instance of dielectric 4 might not be adjacent, while still being proximate. For example, in FIG. 3b, overlap 19 and adhesive or sealer 20 are part of dielectric 4; they are proximate to the outermost conductive surface of roll capacitor 18, but they are not adjacent to it. The structure of dielectric 4 might provide for a combination of dielectric structures and materials, such as the alternating solid strips 11 and fluid part 12 (e.g. air) in FIG. 1d, or nonuniform dielectric 21 in FIG. 3c, which structurally provides for the remainder of dielectric 4 to be air.

5. Three Plate Capacitors

In another type of capacitor, there have been three plates. For example, a series connected capacitor actually consists of two capacitors in series, sharing a common plate between them (thus reducing the plate count for two capacitors from four to three). The common plate typically has substantially twice the surface area of the two end plates; the common plate faces the two end plates, which are disposed edge-on side by side to each other. Alternatively, three plates have been connected to capacitive charging and sensing circuits, for example to create a capacitive switch or memory cell that is on only when two out of the three plates have appropriate charges. While three plate capacitors have not had matched pairs of plates, they have had matched trios of plates proximately facing one another within each trio. Thus, the intraplate internal volume comprises the volume of space within each matched trio. Furthermore, analysis of a matched trio of plates reveals that it still substantially comprises matching pairs of plate surface areas on oppositely facing plates (for example, for each plate trio of a series connected capacitor, the aggregate surface area of the two end plates is substantially matched to the facing surface area of the common plate). Thus, the intraplate internal volume is still clearly delineated, by paired matching plate surface areas on oppositely facing plates, where these plates are part of a plate structure of an n-tuple of mutually facing plates.

These three plates are each electrically connected in a different manner (e.g. to a different circuit or circuit point). Thus, these plates have diverse polarities (instead of simply opposite polarities). Diverse polarities imply two or more different manners of electrical connection, different for each plate element in a designated group said to have diverse polarities. Opposite polarities imply merely two manners of electrical connection for a designated group limited to two plate elements.

Thus, the intraplate internal volume could be said to be delineated by paired matching plate surface areas on oppositely facing plates, where these plates can contribute to the capacitance of the capacitor, and are part of a single structure, comprising an ordered n-tuple of mutually facing plates that all follow an ordered diverse polarity sequence, where this single structure might repeat itself in substantially identical form with the same ordered diverse polarity sequence. This more general characterization of the intraplate internal volume still applies to and covers the simpler structures described for FIGS. 1a–1g, 2, 3.

Figure 4:
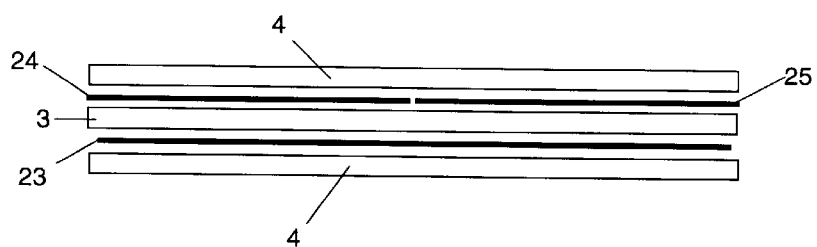
FIG. 4 shows a basic flat three plate capacitor, in elevation view of the plate edges.

A common general structure for such capacitors is shown in FIG. 4, in elevation view of the plate edges. A large plate 23 faces two smaller plates, a plate 24 and a plate 25. Plates 24 and 25 are disposed edge-on side by side. Plates 24 and 25 jointly face plate 23, across dielectric 3. The volume of space occupied by plates 23, 24, 25 and dielectric 3 delineate the intraplate internal volume of the capacitor plate array. Dielectric 4 lies outside this intraplate internal volume, and outside the non-extraneous plate array as a whole.

All three plates of the trio in FIG. 4 could be said to be mutually facing. A designated group of plate elements could be said to be mutually facing if, for every possible pair of the group, at least one straight line can be drawn between each possible pair of the group, without that line passing through any other conductive element in a direction perpendicular to that conductive element. In other words, no conductive element completely intervenes between two plates of the designated group that are on different planes from one another. Thus, for example, plates 23, 24, 25 are mutually facing by this criterion. If there were three plates such as 24, 25 (instead of two) side by side, jointly facing plate 23, then the plates of this quartet would also be mutually facing by this criterion.

On the other hand, two plates could be said to be oppositely facing each other if a preponderance of the lines that can be drawn perpendicular to one of the two plates also pass through the other plate. Thus, in FIG. 4 plates 23 and 24 are oppositely facing, and plates 23 and 25 are oppositely facing, but plates 24 and 25 are not oppositely facing. Generally speaking, capacitance is created from matching plate surface areas on oppositely facing plates.

The structure shown in FIG. 4 might be multiplied, being repeated identically, to form a stacked plate array having a plurality of such structures. Such a stacked plate array would resemble FIG. 2. Like FIG. 2, such a stacked plate array would have some dielectric 3 situated inside the intraplate internal volume, and it would have some dielectric 4, situated outside the intraplate internal volume and outside the non-extraneous plate array as a whole, and in addition it would have some dielectric 5, situated outside the intraplate internal volume but inside the non-extraneous plate array as a whole.

The structure shown in FIG. 4 might be rolled up to form a roll capacitor. Forming such a roll capacitor from such a sandwich structure as FIG. 4 would resemble FIG. 3a. Like FIG. 3a, such a roll capacitor would have some dielectric 3, some dielectric 5, and some dielectric 4.

6. Capacitors with Extraneous Conductive Plate Surface Area

In prior art capacitors, substantially all the plate surface area can substantially contribute to the capacitance of the capacitor, and substantially all the plate surface area can be paired off from oppositely facing pairs of plates—where these plates are members of a single structure having a plurality of mutually facing plates, connected in diverse polarity from one another, and where any multiple repetitions of this plural plate structure all are substantially identical and all have the same ordered diverse polarity sequence among the plural plates. The intraplate internal volume could be said to comprise the volume within this one structure, and within any repeated instances of this structure.

The fact that all of the plate surface area in prior art capacitors meets the above criteria is a limitation of prior art. It is also possible to make a capacitor with further conductive plate surface area that would be extraneous, by failing to meet one or more of the above criteria. For example, further conductive plate surface area might be extraneous by virtue of failing to contribute substantially to capacitance, or by virtue of being located outside the intraplate internal volume, or by virtue of being a plate surface area left over after all plate surface areas meeting all the above criteria have been paired off. Novel capacitors employing extraneous conductive plate surface area are the subject of a separate patent by the inventor.

In such novel capacitors, the role of dielectric 3 remains substantially the same as discussed for the above configurations in FIGS. 1–4. Dielectric 3 could be said to be the dielectric that lies inside the intraplate internal volume, separating the main paired plates or paired plate surface areas that are oppositely facing and contribute substantially to capacitance, provided these plates or plate surface areas meet all the above criteria—i.e. where these plates are members of a single structure having a plurality of mutually facing plates, connected in diverse polarity from one another, and where any multiple repetitions of this plural plate structure all are substantially identical and all have the same ordered diverse polarity sequence among the plural plates.

Likewise, the role of dielectric 5 could be said to remain the same; it could be said to be the dielectric located outside the intraplate internal volume but inside the non-extraneous plate array as a whole. And likewise, dielectric 4 could be said to be the dielectric located outside the intraplate internal volume and also outside the non-extraneous plate array as a whole.

FIGS. 5a–5d show some possible configurations of capacitors incorporating extraneous conductive plate surface area, and some possible embodiments of the present invention as applied to such capacitors.

Figure 5A:
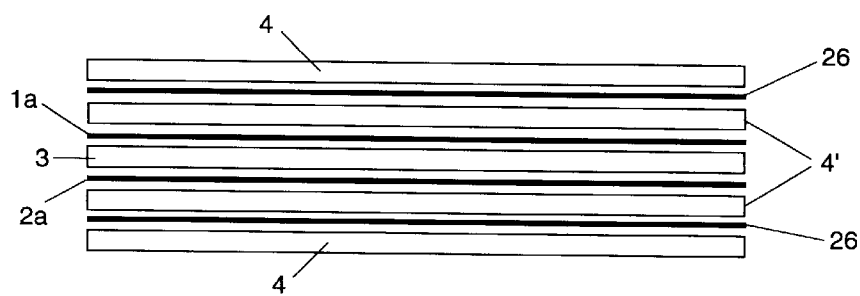
FIG. 5a shows a basic flat two plate capacitor, with further extraneous conductive plate surface areas, in elevation view of the plate edges.

FIG. 5a shows a basic flat two plate capacitor, in elevation view of the plate edges. It is similar to FIG. 1a. As before, plate 1a is paired with plate 2a. The paired plates 1a, 2a contribute to the capacitance of the capacitor, and they are oppositely facing plate members of a single, plural plate structure having only mutually facing plates electrically connected in a diverse manner or polarity from each other, and substantially all the plate surface area of plate 1a can be paired off with matching plate surface area of oppositely facing plate 2a. Having met all these conditions, the paired plates 1a, 2a may be regarded as the main, conventional plates, and as comprising non-extraneous plate surface area. The volume between these plates, including the plates themselves, could be regarded as the intraplate internal volume. Dielectric 3 separates these paired plates from each other, and is located inside the intraplate internal volume.

FIG. 5a adds further conductive plate surface area that is extraneous, in the form of two instances of a conductive plate surface 26. Each conductive plate surface area is extraneous, rather than being another conventional main plate, because it fails to meet all the criteria required to qualify as a conventional main plate. If a conductive plate surface area fails to meet any one of the required criteria, then it automatically qualifies as extraneous conductive plate surface area. It cannot be a non-extraneous plate surface area on a conventional main plate, and thus it cannot delineate an intraplate internal volume, and therefore it cannot serve as a boundary for, or be adjacent to, any instance of dielectric 3.

In the case of FIG. 5a, each instance of conductive plate surface area 26 is extraneous because it does not substantially contribute to the capacitance of the capacitor; and/or because it is located outside the intraplate internal volume; and/or because it cannot belong to the single, plural plate structure containing plates 1a, 2a, and it is left over as a remaining conductive plate surface area after all the plate surface areas on qualifying plates (1a, 2a) have been paired off. Thus, the dielectrics adjacent to each conductive plate surface area 26 cannot be an instance of dielectric 3. Therefore, in accordance with the present invention, if the overall quality of an instance of a dielectric adjacent to conductive plate surface area 26 is made superior to, or equal to, or no greater than 6 times worse than, dielectric 3 that is inside the intraplate internal volume, then this is novel and distinct over prior art.

The dielectric located outside of conductive plate surface area 26 is outside the outermost conductive surface of the capacitor, so it is properly regarded as dielectric 4. A dielectric 4' is located outside the intraplate internal volume, and even outside of the outermost conventional main plate 1a or 2a, thus outside the main plate array as a whole; but it is inside of extraneous conductive plate surface area 26. We choose to regard each instance of dielectric 4' as being an instance of dielectric 4 (not of dielectric 5), because it is located outside of the outermost non-extraneous conductive surface area, hence outside the non-extraneous plate array.

Each instance of dielectric 4' is considered a distinct instance of dielectric 4, and is also distinct from each instance of dielectric 4 as shown in FIG. 5a, because the various instances of dielectric 4' and dielectric 4 are not mutually adjacent, and are at least partially separated from each other by a conductive element. Thus, these various instances of dielectric 4' and dielectric 4 are not considered to be jointly parts of one single instance of dielectric 4.

If the overall quality of any instance of dielectric 5 is superior to any instance of dielectric 3, then the capacitor is distinct over prior art in accordance with the present invention. If the overall quality of any instance of dielectric 4 or 4' is superior to any instance of dielectric 3, then the capacitor is distinct over prior art in accordance with the present invention. If the overall quality of any instance of dielectric 4 (or 4') is equal to, or no greater than 6 times worse than, any instance of dielectric 3, then the capacitor is distinct over prior art in accordance with the present invention, except where dielectric 4 (or 4') and dielectric 3 are wholly fluid and are made from the same fluid as each other. As before, any instance of dielectric 4 could comprise air or could simply be air.

Figure 5B:
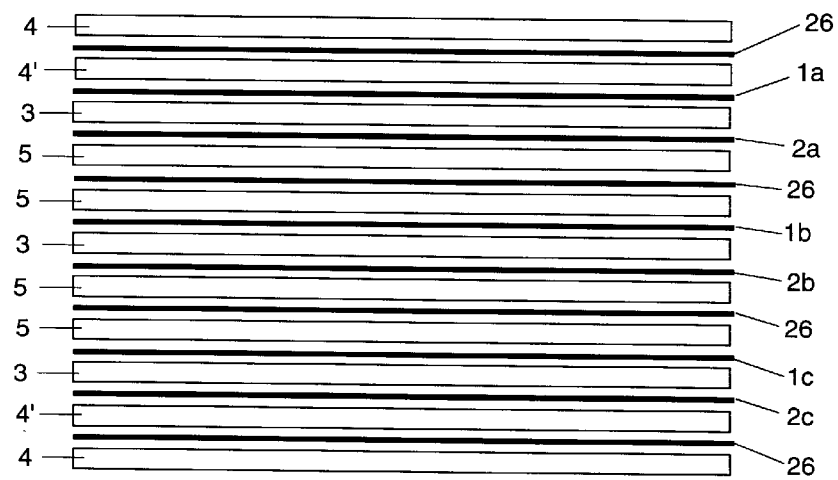
FIG. 5b shows a stacked multiple flat two plate capacitor, with further extraneous conductive plate surface areas, in elevation view of the plate edges.

FIG. 5b shows one possible embodiment of the present invention as applied to a multiple plate stacked capacitor that employs extraneous conductive plate surface areas at some of the possible locations. FIG. 5b shows a stacked flat plate capacitor in elevation view of the plate edges. FIG. 5b is similar to FIG. 2, then adding further elements. As before, plate 1a is paired with plate 2a, 1b with 2b, 1c with 2c, etc. The paired plates 1a, 2a could be said to constitute a qualifying plural plate structure that can be designated, where all plates are mutually facing and are connected in diverse polarity and can contribute to capacitance. This single structure is then repeated in substantially identical form, with the same ordered pair diverse polarity sequence, for each instance of the plate pair 1x, 2x. All of the plate surface area on each plate 1x can be paired off with a substantially equal or matching plate surface area of a plate 2x that is oppositely facing to each plate 1x, where these oppositely facing plates can contribute to the capacitance of the capacitor.

New, further conductive plate surface areas 26 are employed in this stacked plate capacitor. None of the plate surface areas 26 can be regarded as being part of the plural plate (plate 1x, 2x) structure that can be designated, because no plate surface area 26 is mutually facing with any plate pair 1x, 2x. Once a single, plural plate structure is designated (the one containing plates 1x, 2x), then no second structure may be designated, such as one comprising a plurality of plate surface areas 26. Also, in the FIG. 5b example, each instance of plate surface area 26 happens to be isolated from other instances, so no second structure of mutually facing plates or plate surface areas could be formed anyway.

Thus, all instances of conductive plate surface area 26 in FIG. 5b are extraneous. Also, plate surface areas 26 are extraneous because they are left over as a remainder, after all plate surface areas on qualifying plates 1x, 2x have been paired off. Also, plate surface areas 26 are extraneous because in FIG. 5b they do not substantially contribute to capacitance.

Therefore, the intraplate internal volume of the plate array in FIG. 5b is restricted to the volume of space between each plate pair 1x, 2x (in FIG. 5b there are three slices or layers of intraplate internal volume). Again, the intraplate internal volume could be said to be delineated by paired matching plate surface areas on oppositely facing plates, where these plates can contribute to the capacitance of the capacitor, and are part of a single, plural plate structure of an ordered n-tuple of mutually facing plates that all follow an ordered diverse polarity sequence, where this structure might repeat itself in substantially identical form with the same ordered diverse polarity sequence.

It follows that dielectric 3, which occupies only intraplate internal volume, only occurs between each plate pair 1x, 2x. All the other dielectrics in the stack are not dielectric 3.

As before, instances of dielectric 5 are located outside the intraplate internal volume but inside the non-extraneous plate array as a whole, i.e. within the outermost non-extraneous conductive plate surfaces, which in FIG. 5b are plates 1a and 2c. Instances of dielectric 4 as shown in FIG. 5b are located outside the intraplate internal volume, outside the non-extraneous plate array as a whole, and in this example outside the outermost conductive plate surface, whether extraneous or not. Instances of dielectric 4' are located outside the intraplate internal volume, and outside the non-extraneous plate array as a whole (i.e. outside the outermost non-extraneous conductive plate surfaces, which in FIG. 5b are plates 1a and 2c), but inside the outermost extraneous conductive plate surfaces 26. Again, each instance of dielectric 4' is regarded as an instance of dielectric 4.

Each instance of dielectric 4' is considered to be a distinct, separate instance of dielectric 4 from any proximately located instance of dielectric 4 as shown in FIG. 5b; they are not parts of the same instance of dielectric 4 because they are not mutually adjacent and because they are at least partially separated by an instance of conductive element 26.

As before, if the overall quality of any instance of dielectric S is superior to any instance of dielectric 3, then the capacitor is distinct over prior art in accordance with the present invention. If the overall quality of any instance of dielectric 4 or 4' is superior to any instance of dielectric 3, then the capacitor is distinct over prior art in accordance with the present invention. If the overall quality of any instance of dielectric 4 (or 4') is equal to, or is no greater than 6 times worse than, any instance of dielectric 3, then the capacitor is distinct over prior art in accordance with the present invention, except where dielectric 4 (or 4') and dielectric 3 are wholly fluid and are made from the same fluid as each other. As before, any instance of dielectric 4 could comprise air or could simply be air.

Figure 5C:
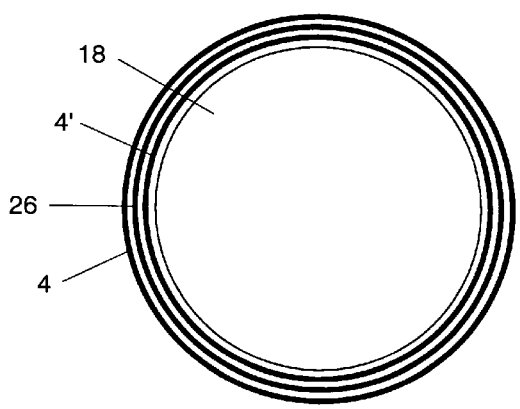
FIGS. 5c–5d show a roll capacitor, with further extraneous conductive plate surface areas, in elevation view of the cylinder end.

FIG. 5c shows a roll capacitor in elevation view of the cylinder end; it is similar to FIG. 3b. As before, capacitor 18 may be regarded as a completely rolled up sandwich structure, with the outermost element being a non-extraneous plate. Outside capacitor 18 are located, respectively, dielectric 4', extraneous conductive plate surface area 26, dielectric 4. Again, dielectric 4' is regarded as a separate, distinct instance of dielectric 4, since it is outside the outermost non-extraneous conductive surface.

Figure 5D:
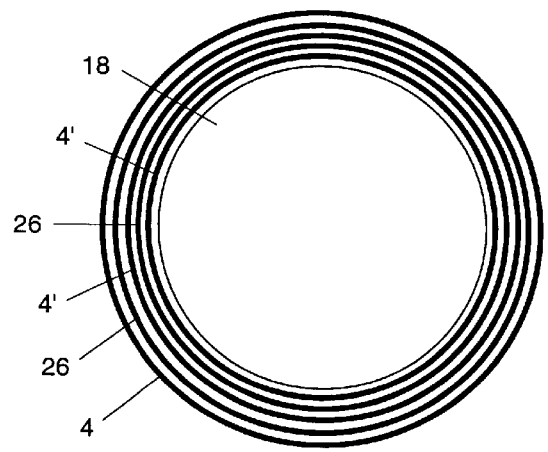

For clarity in FIGS. 5c and 5d, elements 4, 26, 4' are shown as concentric circles applied outside capacitor 18. They could have this form, or some of them could be spirals, perhaps spiralling jointly around capacitor 18. For example, dielectric 4' and extraneous conductive surface area 26 could be extensions of one of the non-extraneous plates and supporting dielectrics from within the capacitor. If one non-extraneous plate of any capacitor is extended substantially beyond its paired mating plate, then the plate surface area of the extension is extraneous conductive plate surface area. This extension and its supporting dielectric could take one joint spiral revolution around capacitor 18, thereby becoming elements 26 and 4' as shown in FIG. 5c.

FIG. 5d is similar to FIG. 5c, but shows two concentric layers each (or two spiral turns each) of extraneous conductive plate surface area 26 and dielectric 4', with dielectric 4 as shown again being the outermost dielectric. FIG. 5d illustrates that there could be a plurality of extraneous plate surface areas in one group; this could occur inside or outside the non-extraneous plate array. FIG. 5d also illustrates that there could be plural instances of dielectric 4' outside the non-extraneous plate array, and all would be regarded as being instances of dielectric 4. These plural instances of dielectric 4' would be regarded as being distinct, separate instances of dielectric 4, because they are not mutually adjacent, and because they are at least partially separated by instances of conductive element 26.

If the distinct layers of dielectric 4' (or dielectric 4) are not concentric, but instead are distinct layers of a contiguous spiral, where these distinct layers are at least partly separated from one another by a conductive element (such as extraneous conductive plate surface area 26), then these distinct layers could be said to count as separate instances of dielectric 4, for purposes of comparison with instances of dielectric 3, in accordance with the present invention. They could be said to count as separate instances because not all parts of the contiguous spiral are mutually adjacent, some parts being at least partly separated from other parts by a conductive element.

Likewise, distinct layers of a contiguous spiral of dielectric 3 or dielectric 5 could be said to count as separate instances of these dielectrics, where these distinct layers are at least partly separated from one another by a conductive element.

Thus, an instance of the spiral dielectric 3 in roll capacitor 18 could be one distinct layer comprising the thickness of dielectric material between conductive elements (a pair of oppositely facing plates). This one instance could then be compared in overall quality with one instance of dielectric 4 or dielectric 5, also comprising the thickness of dielectric material(s) between conductive elements (or outside the outermost conductive element).

In alternative embodiments similar to FIGS. 5c–5d, extraneous conductive plate surface area 26 and/or dielectric 4' might make merely a fraction of one revolution around the circumference of roll capacitor 18, or they might make an integer or non-integer number of revolutions.

Again, if the overall quality of any instance of dielectric 5 (hidden within roll capacitor 18 as shown) is superior to any instance of dielectric 3 (also hidden within roll capacitor 18 as shown), then the capacitor is distinct over prior art in accordance with the present invention. If the overall quality of any instance of dielectric 4 or 4' is superior to any instance of dielectric 3, then the capacitor is distinct over prior art in accordance with the present invention. If the overall quality of any instance of dielectric 4 (or 4') is equal to, or no greater than 6 times worse than, any instance of dielectric 3, then the capacitor is distinct over prior art in accordance with the present invention, except where dielectric 4 (or 4') and dielectric 3 are wholly fluid and are made from the same fluid as each other. As before, any instance of dielectric 4 could comprise air or could simply be air.

7. Other Dielectrics Outside Plate Array

Dielectric 4 has been shown as the dielectric layer located outside the plate array and parallel to the plates of the array. Thus, dielectric 4 has been shown on the top and bottom sides of the flat plate arrays as shown in the above figures, or outside the cylindrical surface of a roll capacitor. But a rectangular flat plate array has six sides, and a polygonal plate array might have more than six sides, and a cylindrical roll capacitor has ends in addition to the cylindrical surface. These other sides of the plate array necessarily have dielectrics too; indeed, a capacitor is necessarily immersed in dielectric (except at the points where its terminals electrically contact the external world). Some of the dielectrics on these other sides might be adjacent to the array, and some might be proximate but not adjacent to the array.

These further instances of dielectric are regarded as being further instances of dielectric 4, because they are outside the non-extraneous plate array as a whole.

Figure 6A:
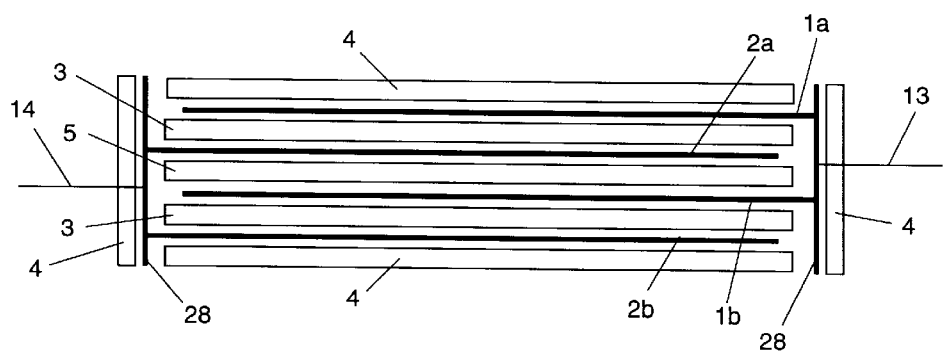
FIG. 6a shows a stacked multiple flat two plate capacitor, in elevation view of the plate edges, illustrating further exterior dielectrics.

FIG. 6a shows a stacked plate capacitor with rectangular plates, in elevation view of the plate edges. FIG. 6a is similar to FIG. 2. As before, instances of dielectric 4 are located outside the plate array as a whole on the top and bottom sides as shown. Instances of dielectric 4 (not shown, for clarity) are also located outside the plate array on the foreground and rear sides as shown in FIG. 6a. These instances of dielectric 4 happen to be adjacent to the plate array.

When there are multiple non-extraneous plates of the same polarity (as in a stacked capacitor), or multiple layers of a single non-extraneous plate (as in a rolled up roll capacitor), it has been the practice to electrically connect these multiple plates or layers in common, and also to terminals 13, 14, by employing a conductive end spray 28 on two sides of the plate array. In FIG. 6a, conductive end sprays 28 are shown on the left and right sides of the plate array. End sprays 28 may be regarded as part of the terminal structure for a capacitor. On the outside of end sprays 28 are further instances of dielectric 4. These further instances of dielectric 4 happen to be proximate to the plate array, but not adjacent.

In prior art finished capacitor products, these further instances of dielectric 4 have been far inferior to dielectric 3. For example, capacitors have often been potted in a thick casing of epoxy, even when the material of dielectric 3 is a superior material such as a thin layer of polypropylene, polystyrene, or tetrafluoroethylene.

It could be advantageous to make the quality of these instances of dielectric 4 superior to prior art. For example, the electromagnetic wave, propagating along end spray 28 from terminal 13 or 14 to reach the various plate edges, could be influenced by the quality of the instance of dielectric 4 adjacent to end spray 28, with similar considerations applying as were explained in conjunction with FIG. 1b. For instance, an improved dielectric 4 could provide improved speed for the electromagnetic wave propagating along end spray 28, thus providing more simultaneous access from terminal 13 or 14 to all plate edges, and thereby providing more simultaneous electrical performance through the capacitor as a whole, with less temporal dispersion and smearing than prior art capacitors that provide slower propagation along end spray 28 due to their inferior dielectric 4 adjacent to end spray 28.

Figure 6B:
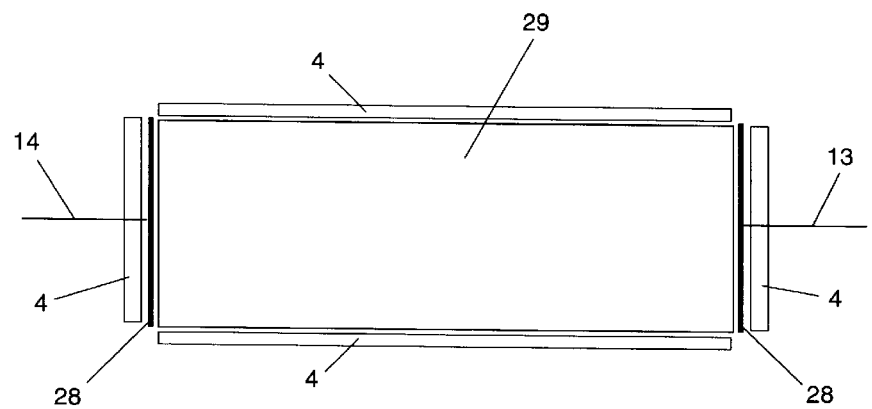
FIG. 6b shows a roll capacitor, in elevation view of the cylinder length, illustrating further exterior dielectrics.

FIG. 6b shows a roll capacitor 29, in elevation view of the cylinder in its full length. Roll capacitor 29 would comprise roll capacitor 18 as shown in FIGS. 5c–5d, and might also comprise a further layer or layers of extraneous conductive plate surface area 26 and/or dielectric 4', as shown in FIGS. 5c–5d. As before, dielectric 4 is located around the cylindrical circumferential surface, outside the plate array, and here outside roll capacitor 29.

End sprays 28 connect the multiple layers of plates 1a, 2a (hidden inside the roll capacitor) to terminals 13, 14. Further instances of dielectric 4 are located on the outside of end sprays 28. These instances of dielectric 4 happen to be proximate to the plate array, but not adjacent.

In prior art capacitors, these further instances of dielectric 4 have been far inferior to dielectric 3. For example, roll capacitors often have their ends filled with a thick layer of epoxy, even when the material of dielectric 3 is a superior material such as a thin layer of polypropylene, polystyrene, or tetrafluoroethylene.

It could be advantageous to make the quality of these instances of dielectric 4 superior to prior art. For example, the electromagnetic wave, propagating along end spray 28 from terminal 13 or 14 to reach the various plate edges, could be influenced by the quality of the instance of dielectric 4 adjacent to end spray 28, with similar considerations applying as were explained in conjunction with FIG. 1b. For instance, an improved dielectric 4 could provide improved speed for the electromagnetic wave propagating along end spray 28, thus providing more simultaneous access from terminal 13 or 14 to all plate edges, and thereby providing more simultaneous electrical performance through the capacitor as a whole, with less temporal dispersion and smearing than prior art capacitors that provide slower propagation along end spray 28 due to their inferior dielectric 4 adjacent to end spray 28.

Each instance of dielectric 4 in FIGS. 6a–6b could be different from other instances of dielectric 4 in the same capacitor. If the overall quality of any instance of dielectric 4 is superior to any instance of dielectric 3, then the capacitor is distinct over prior art in accordance with the present invention. If the overall quality of any instance of dielectric 4 is equal to, or no greater than 6 times worse than, any instance of dielectric 3, then the capacitor is distinct over prior art in accordance with the present invention, except where dielectric 4 and dielectric 3 are wholly fluid and are made from the same fluid as each other. As before, any instance of dielectric 4 could comprise air or could simply be air.

Dielectric 4 or dielectric 5 could be made from any material or materials having a resistivity higher than the material from which plates 1x,2x are made. Thus, dielectric 4 or dielectric 5 could be made from a semiconductive material or some conductive materials.

The nomenclature of the claims may be related to various features of the present invention, shown in the drawings and discussed above in the specification, in a straightforward manner. As discussed above, a basic inner capacitor structure comprises a plate array comprising plurality of plates, with a dielectric inside this plate array to separate the oppositely facing plates from one another, this inner dielectric having a certain average thickness between oppositely facing plates. An outer dielectric may then be added outside this plate array, partially or wholly encapsulating the basic inner capacitor structure, thereby forming a housed capacitor that has utility as a finished capacitor product. The drawings and specification above show several possible embodiments of this outer dielectric 4, housing the basic inner capacitor in various ways, and covering various sides of the plate array.

Outer dielectric 4 could be said to comprise several portions, which might be or might not be contiguous with each other, and which might or might not be contiguous with the dielectric (e.g. dielectric 5) located inside the plate array (a contiguous example is shown in FIG. 3a).

A first portion of outer dielectric 4 could substantially cover the surfaces of the outermost plate or plates, being disposed proximate to and substantially parallel to these outermost plate or plates. For example, in FIGS. 1a–1g, this first portion covers the top surface of plate 1a and the bottom surface of plate 2a, while in FIG. 2 this first portion covers the top surface of plate 1a and the bottom surface of plate 2c, while in FIGS. 3a–3b this first portion covers the outermost surface of the outermost plate 1a of the roll capacitor (the outermost surface of plate 1a being represented within the outermost complete single revolution of plate 1a in the completed roll capacitor).

The covering of each side of a capacitor represents an instance of outer dielectric 4, and an instance of a portion of dielectric 4. For example, with a conventional flat plate capacitor array having a rectangular profile, there would be two instances of the first portion of outer dielectric 4, one instance covering the top surface of the top outermost plate and one instance covering the bottom surface of the bottom outermost plate. For example, with a conventional rolled plate capacitor having a circular cross section, there could be one instance of this first portion of outer dielectric 4, covering the circumferential periphery of the cylinder by covering the outermost surface of the outermost plate. If a rolled plate capacitor were compressed into an oval shaped cross section, it might still have one instance of this first portion of outer dielectric 4. If a rolled plate capacitor were compressed into a shape having a substantially rectangular cross section (perhaps with rounded corners), it could be meaningful to regard this first portion of outer dielectric 4 as comprising four instances instead of one instance. The claims prescribe the thickness of at least one instance of outer dielectric 4 (selected from either the first, second, or third portion of dielectric 4).

This first portion of outer dielectric 4 could cover substantially the entirety of the outer surfaces of the outermost plates. In the case of capacitors with plural outermost plates (e.g. flat plate capacitors) this first portion could cover every one (not just some) of the several outermost plates (e.g. plates 1a and 2a in FIGS. 1a–1g; plates 1a and 2c in FIG. 2). Furthermore, this first portion could comprise substantially the same material for its covering of each and every one of the outermost plates (as shown in FIGS. 1a–1g and FIG. 2).

It is noted that the employment of a dielectric comprising substantially the same material, for this first portion's covering of each and every one of the outermost plates, is shown in FIGS. 1a–1g, and furthermore logically follows from the above specification's explanations of the objects and advantages of the present invention. The present invention seeks to house a capacitor in a covering sufficient to adequately protect it for the intended application, but at the same time seeks to house a capacitor in a covering that will have the minimum adverse dielectric consequences, as explained in conjunction with FIG. 1b. As shown by FIG. 1b and accompanying discussion, the electromagnetic wave propagates predominantly along the surfaces of the plates, in order to reach all parts of the plate surface, and the electromagnetic wave propagation considerations are symmetrical for the surfaces of all of the outermost plates. It logically follows that the sufficient but minimum covering for the top outermost plate could advantageously be substantially similar to the sufficient but minimum covering for the bottom outermost plate, and thus could advantageously be limited to comprising substantially the same material.

As shown in FIGS. 1d, 1g, this first portion of outer dielectric 4 might employ a composite or combination of plural distinct materials (possibly including a fluid, in the form of a liquid or a gas), and also might be nonuniform (e.g. in material composition) over the surface of one plate. If plural distinct materials are employed, then that material which is the worst quality dielectric (has the highest quality index) among this plurality could appropriately be the criterion upon which sameness of comprised material is judged, since, in accordance with the teachings above, this worst material would have the greatest effect (per given thickness) upon the electric field propagating along the surface of the outermost plate surfaces, as shown in FIG. 1b.

The thickness of this first portion could be measured in a direction substantially perpendicular to the surfaces of the plates. If this first portion comprises a contained fluid (liquid or gas), then its thickness could be measured to the wall of any containment vessel. If this first portion constitutes substantially only an uncontained gas, then (for the sake of completeness) its thickness will be defined as the same thickness as that of an instance of inner dielectric between plates.

In the case of a roll capacitor with rolled up or convolutely wound plates, e.g. as shown in FIG. 3b, this first portion of outer dielectric 4, if comprising a solid material, could extend more than one complete turn around the outermost surface of the outer plate 1a, this turn and further extension (shown as overlap 19) being in substantially the same direction that the plates are rolled or convolutely wound (as opposed to being in the axial direction perpendicular to this winding direction). As discussed above for FIGS. 3a–3b, this turn and/or further extension of outer dielectric 4 could comprise a contiguous extension of an inner dielectric (e.g. dielectric 5 or 3), or could comprise a separate piece of dielectric (e.g. a wrap), or some combination thereof (such as a separate piece of dielectric outer wrap that is partially inserted into the plate array). For the basic inner structure of a roll capacitor to be adequately housed, in accordance with the present invention's claims of a housed capacitor, it could be advantageous to provide appropriate means to prevent the rolled up inner structure from unravelling; for example, as shown in FIG. 3b, this appropriate means could comprise overlap 19 and/or adhesive or sealer 20.

As shown in FIGS. 6a–6b, a second portion of outer dielectric 4 could be disposed proximate to those edges of the plates where terminals 13,14 and/or end sprays 28 are connected to the plates, to make external electrical connection for the plural polarities necessarily involved in any capacitor. Terminals and/or end sprays are connecting means suitable for making external electrical connection in plural polarities to the plurality of plates in the plate array. For the housed capacitor to have utility as a finished capacitor product, at least a portion of the connecting means for each polarity could be located outside the plate array (as shown in FIGS. 6a–6b), so that external electrical connection may be made via these connecting means.

This second portion of outer dielectric 4 could be substantially perpendicular to the surfaces of the plates, and its thickness could be measured in a direction substantially parallel to the surfaces of the plates. There will normally be two instances of this second portion of outer dielectric 4, one instance at each edge of the plate array where connecting means are attached. As shown and discussed above (for FIGS. 1c, 1d, 1g), dielectric 4 generally and hence the second portion of dielectric 4 in particular might employ a composite or combination of plural distinct materials (possibly including a fluid, in the form of a liquid or a gas), and also might be nonuniform (e.g. in material composition). Likewise, if the second portion comprises a contained fluid (liquid or gas), then its thickness could be measured to the wall of any containment vessel. If this second portion constitutes substantially only an uncontained gas, then (for the sake of completeness) its thickness will be defined as the same thickness as that of an instance of inner dielectric between plates.

As discussed in the specification text for FIG. 6a, a third portion of outer dielectric 4 could be disposed proximate to those edges of a flat plate array where connecting means are not attached. In FIG. 6a these are the foreground and rear edges of the plates in the plate array. This third portion could be substantially perpendicular to the surfaces of the plates, and its thickness could be measured in a direction substantially parallel to the surfaces of the plates. There will normally be two instances of this third portion of outer dielectric 4 for flat plate capacitors, one instance at each edge of the plate array where connecting means are not attached. Rolled plate capacitors will normally have no instances of this third portion of outer dielectric 4. As shown and discussed above (for FIGS. 1c, 1d, 1g), dielectric 4 generally and hence the third portion of dielectric 4 in particular might employ a composite or combination of plural distinct materials (possibly including a fluid, in the form of a liquid or a gas), and also might be nonuniform (e.g. in material composition). Likewise, if the third portion comprises a contained fluid (liquid or gas), then its thickness could be measured to the wall of any containment vessel. If this third portion constitutes substantially only an uncontained gas, then (for the sake of completeness) its thickness will be defined as the same thickness as that of an instance of inner dielectric between plates.

As shown by FIG. 1b and accompanying discussion, the predominant electromagnetic wave propagation is along the surfaces of the plates, in order to reach all parts of the plate surface, and the side of a capacitor with the first portion of dielectric, that side parallel to the plate surfaces, could be the most sensitive to degradation by proximate external dielectrics. It logically follows that, if a flat plate capacitor is to be installed proximate to another external dielectric such as a printed circuit board, then it could be advantageous to orient the capacitor such that the plate edges rather than the plate surfaces are closest to this external dielectric, whereby this predominant electromagnetic wave propagation would be minimally interfered with by this external dielectric. In a normal flat plate capacitor, two opposing sets of edges will contain electrical connecting means, so it logically follows that it could be advantageous to orient the capacitor such that this external dielectric is closest to one of the remaining two sets of edges, namely those edges where the third portion of outer dielectric 4 is situated. Moreover, in capacitor applications on printed circuit boards it can be common for a conductive trace to be located directly underneath the capacitor position, this conductive trace needing to be insulated from the plates of the capacitor. Therefore, it logically follows that it could be advantageous, when providing housing for a flat plate capacitor in accordance with the present invention, to limit the present invention by providing that this third portion of outer dielectric 4 comprise a solid or liquid dielectric, rather than merely a gaseous dielectric.

Likewise, it logically follows, from FIG. 1b and accompanying discussion, that this third portion need not be limited in the same way as the first portion, insofar as comprising the same material for both opposing sides, since the electromagnetic wave shown in FIG. 1b propagates predominantly through the first portion, not this third portion, to reach all parts of the plate surfaces, and thus this electromagnetic wave is less affected by the quality of the material employed for this third portion. For example, it could be advantageous for one side of the third portion (the side designated to be placed nearest the printed circuit board) to comprise a different material than the opposing side of the third portion (which could be designated to be placed away from the printed circuit board, for example by placing the capacitor label on this side). The side to be placed near the printed circuit board could comprise a more sturdy material with poorer dielectric quality, whereas the side to be placed away from the printed circuit board could comprise a less sturdy material with better dielectric quality.

Likewise, it logically follows that the second portion of outer dielectric 4 need not be limited to comprising the same material for both opposing sides. For example, this second portion might advantageously comprise different materials, for both flat plate capacitors (shown in FIG. 6a) and rolled plate capacitors (as shown in FIG. 6b). As is recognized by the art, the two terminals of a capacitor are connected in different electrical polarities, and thus an electromagnetic wave propagating from one terminal to the other might not be the same or symmetrical for the two opposing sides of the second portion, one terminal being the transmitter and the other the receiver, as shown in FIG. 1b. Thus, for example, it might be advantageous for one side of this second portion to comprise a material optimized as an electromagnetic wave transmitter or launcher, and for the other side to comprise a material optimized as an electromagnetic wave receiver or damper.

It is noted that the specification language under Description of Prior Art explicitly defines degradative effect (of an instance of dielectric) in terms of average thickness and average quality index. In the case where plural dielectric materials are employed in one instance of outer dielectric 4, this average quality index could represent a weighted average, in manners known to the art, utilizing factors discussed in conjunction with FIGS. 1b–1g, including the relative amounts of different materials employed and their location (e.g. relative proximity to a capacitor plate). Quality index is defined in terms of measurements and observable phenomena that are well recognized by the art; these include dielectric constant, dielectric absorption, dissipation factor, molecular dipole moment, reciprocal of propagation velocity, and observable degradation of a signal processed by a test conductor that is placed adjacent to a given sized test piece of different dielectric materials in turn (this protocol being a recognized standard method for testing the electrical quality of dielectric materials).

The basic teaching of the above specification is that at least one instance of outer dielectric, on at least one side of a capacitor, should have an overall degradative effect less than 6 times worse than the overall degradative effect of the inner dielectric employed between a pair of facing plates, where each overall degradative effect is defined as the mathematical product of average thickness and average quality index. This is synonymous with mathematically saying that $(T_{sub2})(Q_{sub2})/(T_{sub1})(Q_{sub1})$ be less than 6, where $T_{sub2}$ is the thickness of at least one instance of outer dielectric, and $Q_{sub2}$ is the average quality index of at least one instance of outer dielectric, and $T_{sub1}$ is the average thickness of the inner dielectric employed between pairs of oppositely facing plates, and $Q_{sub1}$ is the average quality index of this inner dielectric. This mathematical expression may be simply rearranged, to furnish a prescription for the maximum thickness of outer dielectric that should be employed, in at least one instance (presumably the thinnest instance), in order to be in accordance with the above teachings of the present invention: at least one instance of $T_{sub2}$ should be less than $6R(T_{sub1})$, where R is the ratio $(Q_{sub1})/(Q_{sub2})$. As discussed above, if an instance of outer dielectric is an uncontained gas (e.g. air), then $T_{sub2}$ is defined as being the same as $T_{sub1}$, and thus the use of an uncontained gas as an instance of outer dielectric is covered within the teachings and claims of the present invention.

As discussed above, the quality index comprises a measure of dielectric quality recognized by the art, configured such that a higher index represents poorer dielectric quality. Examples of such measures given above include: dielectric constant, dielectric absorption, dissipation factor, molecular dipole moment, reciprocal of propagation velocity, and observable degradation of a signal processed by a test conductor that is placed adjacent to a given sized test piece of different dielectric materials in turn (this protocol being a recognized standard method for testing the electrical quality of dielectric materials). Any single measure of dielectric quality, chosen from this list, is used to assess the quality index for both dielectrics, the inner and outer ones. Since the art recognizes that a material with worse (higher) dielectric absorption generally also has worse (higher) dissipation factor, etc., the various possible ratios R will generally track consistently with one another, regardless of which measure from this list is chosen to assess quality index. If it is desired to completely avoid any possible ambiguity, it would be possible to calculate the ratio R for each of the measures in this list. The highest ratio R could then be selected, and plugged into the formula 6R(Tsub1), in order to give the greatest scope and inclusion under the present invention. Conversely, selecting the smallest ratio R would give the most narrow and restricted scope for inclusion under the present invention.

Thus, it logically and mathematically follows that the prescription provided by the above teachings of the present invention is also equivalent to saying that Tsub2 should be less than 6R (Tsub1), where R is the greatest numerical ratio selected from the group consisting of the ratio of (dielectric constant sub1)/(dielectric constant sub2), and the ratio of (dissipation factor sub1)/(dissipation factor sub2), and the ratio of (dielectric absorption sub1)/(dielectric absorption sub2), etc. It is noted that the ratio of the reciprocal of propagation velocities (sub1)/(sub2) is equivalent to the ratio of propagation velocities (sub2)/(sub1).

It can be appreciated that the formula 6R(Tsub1) gives the greatest scope and inclusion under the present invention, and that alternative prescription formulas for Tsub2 less than 3R (Tsub1) or 2R(Tsub1) would narrow the scope of the present invention, by including less of an allowable range for the thickness Tsub2 of the thinnest instance of the outer dielectric.

As is recognized by the art, a flat plate capacitor can be subsequently formed into any three dimensional shape, and a roll or convolutely wound capacitor can be formed into shapes other than purely cylindrical. Capacitors with any such further shapes shall be deemed to be in accordance with the present invention.

Any definitions or criteria given in this specification are possible illustrative examples, contributing to the description of some possible embodiments of the present invention. These definitions and criteria do not delimit the present invention, either inclusively or exclusively.

Although the present invention has been described in considerable detail in the above specification, it is not intended that the invention be limited to such detail except as necessitated by the appended claims or their legal equivalent.

I claim:

1. A housed capacitor comprising:
   (a) a plate array comprising a plurality of plates in proximity to one another,
      said plates being substantially flat and conductive,
      said plates having a surface, a first edge or edges, and a second edge or edges,
      at least two of said plates being outermost plates,
      each of said outermost plates having an outermost surface,
      said plate array having a plurality of sides,
   (b) a first dielectric located inside said plate array,
      each oppositely facing pair of said plates being separated from each other by an instance of said first dielectric,
      the instances of said first dielectric having an average thickness T,
      said first dielectric comprising a first material,
      said first material being substantially solid at 1 degree celsius,
   (c) a second dielectric located outside said plate array,
      said second dielectric comprising a second material,
      an instance of said second dielectric being disposed proximate to each side of said plate array,
   (d) and connecting means suitable for making external electrical connection in plural polarities to said plurality of plates,
      said plurality of plates being electrically connected in said plural polarities to said connecting means,
      said connecting means being connected to said plates at said first edge or edges,
      at least a portion of said connecting means for each of said plural polarities being located outside said plate array,
   (e) said second dielectric comprising a first portion, a second portion, and a third portion,
      said outermost surface of each of said outermost plates being covered by said first portion,
      said first portion being disposed proximate to and substantially parallel to each said outermost surface,
      said first portion having a thickness measured substantially perpendicular to said surface of said plates,
      said second portion being disposed proximate to said first edge or edges,
      said second portion being substantially perpendicular to said first portion,
      said second portion having a thickness measured in a direction substantially parallel to said surface of said plates,
      said third portion being disposed proximate to said second edge or edges,
      said third portion covering at least some portion of said second edge or edges, of at least one of said plates connected in each of said plural polarities,
      said third portion being substantially perpendicular to said first portion and substantially perpendicular to said second portion,
      said third portion having a thickness measured in a direction substantially parallel to said surface of said plates,
      said third portion comprising a material that, at 1 degree celsius, is selected from the group consisting of a substantially solid material and a liquid material,
   (f) the improvement comprising at least one instance of said second dielectric having a form selected from the group of: (i) comprising entirely an uncontained gas, and (ii) comprising a solid with a thickness less than the numerical product 6RT,
      wherein said T represents said average thickness of said first dielectric,
      wherein said R is a numerical ratio selected from the group consisting of:
         the ratio of dielectric constant for said first material to dielectric constant for said second material, and the ratio of dielectric absorption for said first material to dielectric absorption for said second material, and the ratio of dissipation factor for said first material to dissipation factor for said second material, and the ratio of molecular dipole moment for said first material to molecular dipole moment for said second material, and the ratio of propagation velocity for an electromagnetic wave in said second material to propagation velocity for an electromagnetic wave in said first material, and the ratio of observable degradation of a signal processed by a test conductor placed adjacent to a given dimensioned test sample of said first material to observable degradation of a signal processed by a test conductor placed adjacent to a given same dimensioned test sample of said second material.

2. The housed capacitor of claim 1 wherein said R is the smallest numerical ratio selected from the group consisting of:

the ratio of dielectric constant for said first material to dielectric constant for said second material, and the ratio of dielectric absorption for said first material to dielectric absorption for said second material, and the ratio of dissipation factor for said first material to dissipation factor for said second material, and the ratio of molecular dipole moment for said first material to molecular dipole moment for said second material, and the ratio of propagation velocity for an electromagnetic wave in said second material to propagation velocity for an electromagnetic wave in said first material, and the ratio of observable degradation of a signal processed by a test conductor placed adjacent to a given dimensioned test sample of said first material to observable degradation of a signal processed by a test conductor placed adjacent to a given same dimensioned test sample of said second material.

3. The housed capacitor of claim 1 wherein at least one instance of said second dielectric comprises a solid with a thickness less than the numerical product 3RT.

4. The housed capacitor of claim 1 wherein at least one instance of said second dielectric comprises a solid with a thickness less than the numerical product 2RT.

5. The housed capacitor of claim 1 wherein said first dielectric comprises a flexible plastic film material.

6. A housed capacitor comprising:

(a) a plate array comprising a plurality of plates in proximity to one another,
  said plates being conductive and rolled up or convolutely wound,
  said plates having a surface, a first edge or edges, and a second edge or edges,
  at least one of said plates being an outermost plate,
  each said outermost plate having an outermost surface,
  said plate array having a plurality of sides, (b) a first dielectric located inside said plate array,
  each oppositely facing pair of said plates being separated from each other by an instance of said first dielectric,
  the instances of said first dielectric having an average thickness T,
  said first dielectric comprising a first material,
  said first material being substantially solid at 1 degree celsius, (c) a second dielectric located outside said plate array,
  said second dielectric comprising a second material,
  an instance of said second dielectric being disposed proximate to each side of said plate array, (d) and connecting means suitable for making external electrical connection in plural polarities to said plurality of plates,
  said plurality of plates being electrically connected in said plural polarities to said connecting means,
  said connecting means being connected to said plates at said first edge or edges,
  at least a portion of said connecting means for each of said plural polarities being located outside said plate array, (e) said second dielectric comprising a first portion and a second portion,
  said first portion being disposed proximate to and substantially parallel to each said outermost surface,
  said first portion having a thickness measured substantially perpendicular to said surface of said plates,
  said first portion covering said outermost surface of each said outermost plate,
  said first portion extending more than one complete turn around said outermost surface of said outermost plate, in the direction that said outermost plate is rolled or convolutely wound, in the case where said first portion comprises a material that is substantially solid at 1 degree celsius,
  said second portion being disposed proximate to said first edge or edges,
  said second portion being substantially perpendicular to said first portion,
  said second portion having a thickness measured in a direction substantially parallel to said surface of said plates, (f) the improvement comprising at least one instance of said second dielectric having a form selected from the group of: (i) comprising entirely an uncontained gas, and (ii) comprising a solid with a thickness less than the numerical product 6RT,
  wherein said T represents said average thickness of said first dielectric,
  wherein said R is a numerical ratio selected from the group consisting of:
    the ratio of dielectric constant for said first material to dielectric constant for said second material, and the ratio of dielectric absorption for said first material to dielectric absorption for said second material, and the ratio of dissipation factor for said first material to dissipation factor for said second material, and the ratio of molecular dipole moment for said first material to molecular dipole moment for said second material, and the ratio of propagation velocity for an electromagnetic wave in said second material to propagation velocity for an electromagnetic wave in said first material, and the ratio of observable degradation of a signal processed by a test conductor placed adjacent to a given dimensioned test sample of said first material to observable degradation of a signal processed by a test conductor placed adjacent to a given same dimensioned test sample of said second material.

7. The housed capacitor of claim 6 wherein said R is the smallest numerical ratio selected from the group consisting of:

the ratio of dielectric constant for said first material to dielectric constant for said second material, and the ratio of dielectric absorption for said first material to dielectric absorption for said second material, and the ratio of dissipation factor for said first material to dissipation factor for said second material, and the ratio of molecular dipole moment for said first material to molecular dipole moment for said second material, and the ratio of propagation velocity for an electromagnetic wave in said second material to propagation velocity for an electromagnetic wave in said first material, and the ratio of observable degradation of a signal processed by a test conductor placed adjacent to a given dimensioned test sample of said first material to observable degradation of a signal processed by a test conductor placed adjacent to a given same dimensioned test sample of said second material.

8. The housed capacitor of claim 6 wherein at least one instance of said second dielectric comprises a solid with a thickness less than the numerical product 3RT.

9. The housed capacitor of claim 6 wherein at least one instance of said second dielectric comprises a solid with a thickness less than the numerical product 2RT.

10. The housed capacitor of claim 6 wherein said first dielectric comprises a flexible plastic film material.

11. A method for housing a capacitor,
said capacitor comprising:
(a) a plate array comprising a plurality of plates in proximity to one another,
said plates having a surface, a first edge or edges, and a second edge or edges,
at least one of said plates being an outermost plate,
each said outermost plate having an outermost surface,
said plate array having a plurality of sides,
(b) a first dielectric located inside said plate array,
each oppositely facing pair of said plates being separated from each other by an instance of said first dielectric,
the instances of said first dielectric having an average thickness T,
said first dielectric comprising a first material,
said first material being substantially solid at 1 degree celsius,
(c) and connecting means suitable for making external electrical connection in plural polarities to said plurality of plates,
said plurality of plates being electrically connected in said plural polarities to said connecting means,
said connecting means being connected to said plates at said first edge or edges,
at least a portion of said connecting means for each of said plural polarities being located outside said plate array,
(d) said method comprising the step of providing a second dielectric located outside said plate array,
said second dielectric comprising a second material,
an instance of said second dielectric being disposed proximate to each side of said plate array,
said second dielectric comprising a first portion and a second portion,
and the step of providing that said first portion be disposed proximate to and substantially parallel to each said outermost surface,
said first portion having a thickness measured substantially perpendicular to said surface of said plates,
said first portion covering said outermost surface of each said outermost plate,
said first portion extending more than one complete turn around said outermost surface of said outermost plate, in the direction that said outermost plate is rolled or convolutely wound, in the case where said capacitor is a roll capacitor or a convolutely wound capacitor and in the case where said first portion comprises a material that is substantially solid at 1 degree celsius,
and the step of providing that said second portion be disposed proximate to said first edge or edges,
said second portion being substantially perpendicular to said first portion,
said second portion having a thickness measured in a direction substantially parallel to said surface of said plates,
and the step of providing a third portion of said second dielectric in the case where said plurality of plates comprise flat plates,
said third portion being disposed proximate to said second edge or edges,
said third portion covering at least some portion of said second edge or edges, of at least one of said plates connected in each of said plural polarities,
said third portion being substantially perpendicular to said first portion and substantially perpendicular to said second portion,
said third portion having a thickness measured in a direction substantially parallel to said surface of said plates,
said third portion comprising a material that, at 1 degree celsius, is selected from the group consisting of a substantially solid material and a liquid material,
(e) and the step of providing that at least one instance of said second dielectric has a form selected from the group of: (i) comprising entirely an uncontained gas, and (ii) comprising a solid with a thickness less than the numerical product 6RT,
wherein said T represents said average thickness of said first dielectric,
wherein said R is a numerical ratio selected from the group consisting of:
the ratio of dielectric constant for said first material to dielectric constant for said second material, and the ratio of dielectric absorption for said first material to dielectric absorption for said second material, and the ratio of dissipation factor for said first material to dissipation factor for said second material, and the ratio of molecular dipole moment for said first material to molecular dipole moment for said second material, and the ratio of propagation velocity for an electromagnetic wave in said second material to propagation velocity for an electromagnetic wave in said first material, and the ratio of observable degradation of a signal processed by a test conductor placed adjacent to a given dimensioned test sample of said first material to observable degradation of a signal processed by a test conductor placed adjacent to a given same dimensioned test sample of said second material.

12. The method of claim 11 wherein said R is the smallest numerical ratio selected from the group consisting of:
the ratio of dielectric constant for said first material to dielectric constant for said second material, and the ratio of dielectric absorption for said first material to dielectric absorption for said second material, and the ratio of dissipation factor for said first material to dissipation factor for said second material, and the ratio of molecular dipole moment for said first material to molecular dipole moment for said second material, and the ratio of propagation velocity for an electromagnetic wave in said second material to propagation velocity for an electromagnetic wave in said first material, and the ratio of observable degradation of a signal processed by a test conductor placed adjacent to a given dimensioned test sample of said first material to observable degradation of a signal processed by a test conductor placed adjacent to a given same dimensioned test sample of said second material.

13. The method of claim 11 wherein at least one instance of said second dielectric comprises a solid with a thickness less than the numerical product 3RT.

14. The method of claim 11 wherein at least one instance of said second dielectric comprises a solid with a thickness less than the numerical product 2RT.

15. The method of claim 11 wherein said first dielectric comprises a flexible plastic film material.

* * * * *